US011956179B2

(12) United States Patent
Wu et al.

(10) Patent No.: US 11,956,179 B2
(45) Date of Patent: Apr. 9, 2024

(54) DUPLICATED DATA SEQUENCE TRANSMISSIONS WITH REDUCED PEAK TO AVERAGE POWER RATIO

(71) Applicant: QUALCOMM Incorporated, San Diego, CA (US)

(72) Inventors: Kanke Wu, San Diego, CA (US); Jialing Li Chen, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 17/382,263

(22) Filed: Jul. 21, 2021

(65) Prior Publication Data
US 2022/0029772 A1    Jan. 27, 2022

Related U.S. Application Data

(60) Provisional application No. 63/055,316, filed on Jul. 22, 2020.

(51) Int. Cl.
*H04L 5/00*    (2006.01)
*H04W 72/0453*    (2023.01)

(52) U.S. Cl.
CPC ............ *H04L 5/0098* (2013.01); *H04L 5/001* (2013.01); *H04L 5/003* (2013.01); *H04W 72/0453* (2013.01)

(58) Field of Classification Search
CPC ....... H04L 5/0098; H04L 5/001; H04L 5/003; H04L 5/0044; H04L 5/0048;
(Continued)

(56) References Cited

U.S. PATENT DOCUMENTS

| 2010/0138631 A1* | 6/2010 | Gangalakurti | G06F 7/5446 712/7 |
| 2011/0222478 A1* | 9/2011 | Lee | H04W 72/30 370/328 |

(Continued)

FOREIGN PATENT DOCUMENTS

WO    2014085686 A1    6/2014

OTHER PUBLICATIONS

International Search Report and Written Opinion—PCT/US2021/042819—ISA/EPO—dated Nov. 5, 2021.
(Continued)

*Primary Examiner* — Hardikkumar D Patel
(74) *Attorney, Agent, or Firm* — Kevin M. Donnelly; Loza & Loza LLP

(57) ABSTRACT

Duplicated physical layer convergence protocol (PLCP) protocol data unit (PPDU) transmission is described for a wireless device with reduced peak-to-average power ratios (PAPR). One example includes obtaining a first sub-PPDU from to PPDU that includes a data field with data content. A second sub-PPDU may also be obtained by duplicating the PPDU including the data content of the PPDU. At least one of a phase rotation, a phase offset, or a phase ramp is applied to at least a portion of a second set of sub-carrier of a wideband channel. The first sub-PPDU is transmitted on a first set of sub-carriers of the wideband channel and the second sub-PPDU is transmitted on the second set of sub-carriers of the wideband channel.

28 Claims, 11 Drawing Sheets

(58) Field of Classification Search
CPC ............. H04L 27/2621; H04L 27/2602; H04L 27/2634; H04W 72/0453
See application file for complete search history.

(56) References Cited

U.S. PATENT DOCUMENTS

2017/0063589 A1* 3/2017 Chen ................. H04L 5/0023
2018/0270086 A1* 9/2018 Lin ................... H04W 72/1268

OTHER PUBLICATIONS

Liu J., et al., (Mediatek Inc): "DCM for Range Extension in 6GHz LPI Band", IEEE Draft, 11-20-0986-00-00BE-DCM-for-Range-Extension-in-6GHZ-LPI-Band, IEEE-SA Mentor, Piscataway, NJ USA vol. 802.11 EHT, 802.11be, Jul. 1, 2020 (Jul. 1, 2020), pp. 1-6, XP068172845, Retrieved from the Internet: URL: https://mentor.ieee.org/802.11/dcn/20/11-20-0986-00-00be-dom-for-range-extension-in-6ghz-lpi-band.pptx. [Retrieved on Jul. 1, 2020] Slide 5.

Park E., et al., (LG Electronics): "PAPR Issues for EHT ER SU PPDU", IEEE Draft, 11-20-1135-01-00BE-PAPR-Issues-for-EHT-ERSU-PPDU, IEEE-SA Mentor, Piscataway, NJ USA, vol. 802.11 EHT, 802.11be, No. 1, Jul. 30, 2020 (Jul. 30, 2020), pp. 1-10, XP068170318, Retrieved from the Internet: URL: https://mentor.ieee.org/802.11/dcn/20/11-20-1135-01-00be-papr-issues-for-eht-ersu-ppdu.pptx. [Retrieved on Jul. 30, 2020], Slides 3-5.

Sundaravaradhan S.P., et al.,(Broadcom): "PDT PHY-EHT DUP Mode", IEEE Draft, 11-21-0139-01-00BE-PDT-PHY-EHT-DUP-Mode, IEEE-SA Mentor, Piscataway, NJ USA, vol. 802.11 EHT, 802.11be. No. 1, Jan. 28, 2021 (Jan. 28, 2021), pp. 1-9, XP068176057, Retrieved from the Internet: URL: https://mentor.ieee.org/802.11/dcn/21/11-21-0139-01-00be-pdt-phy-eht-dup-mode.docx. [Retrieved on Jan. 28, 2021], p. 3-p. 7.

Zhang H, "1MHz Dup mode ; 11-12-1313-00-00ah-1mhz-dup-mode", IEEE SA Mentor; 11-12-1313-00-00AH-1MHZ-DUP-MODE, IEEE-SA Mentor, Piscataway, NJ USA, vol. 802.11ah, Nov. 12, 2012 (Nov. 12, 2012), pp. 1-11, XP068040154, [retrieved on Nov. 121, 2012 p. 5-p. 7.

* cited by examiner

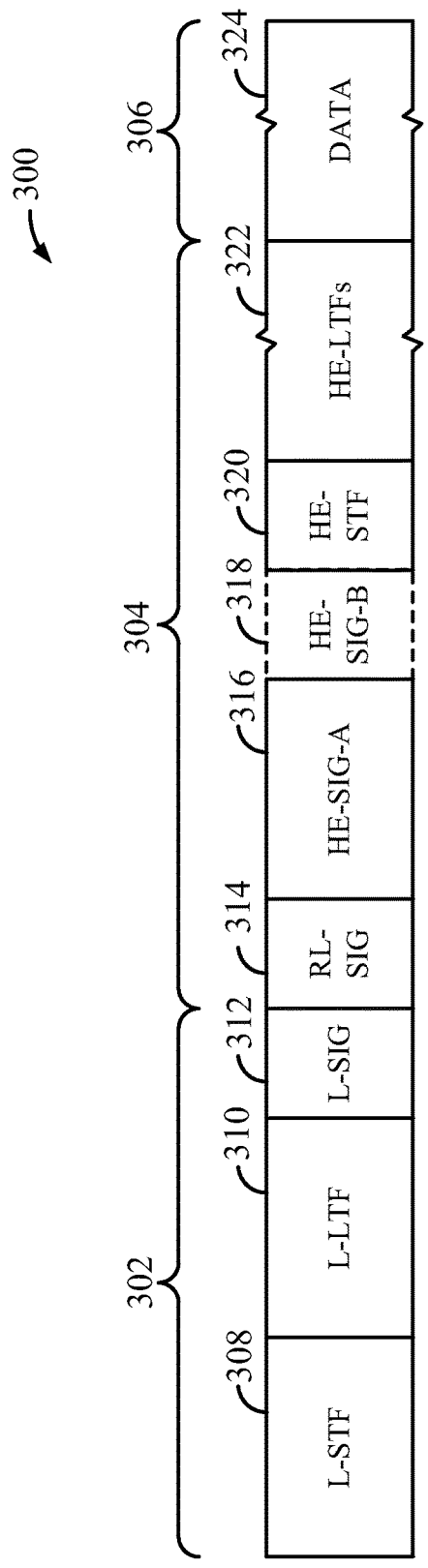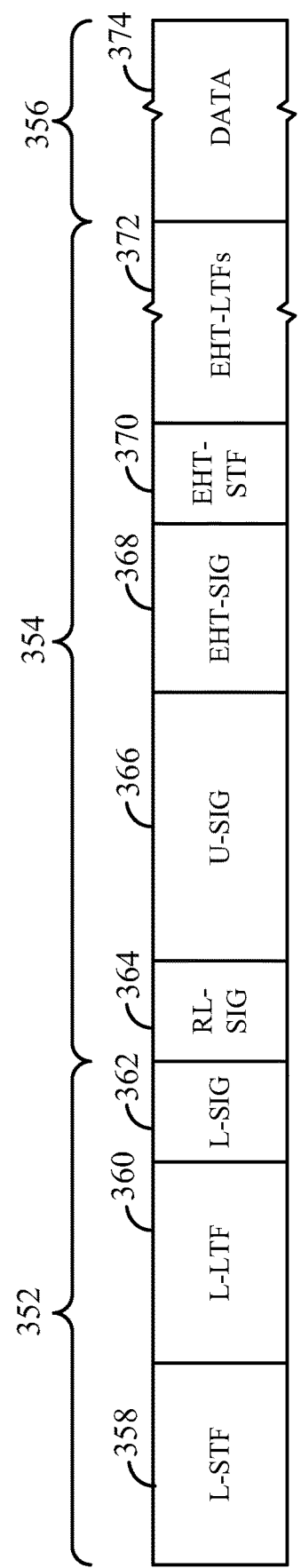

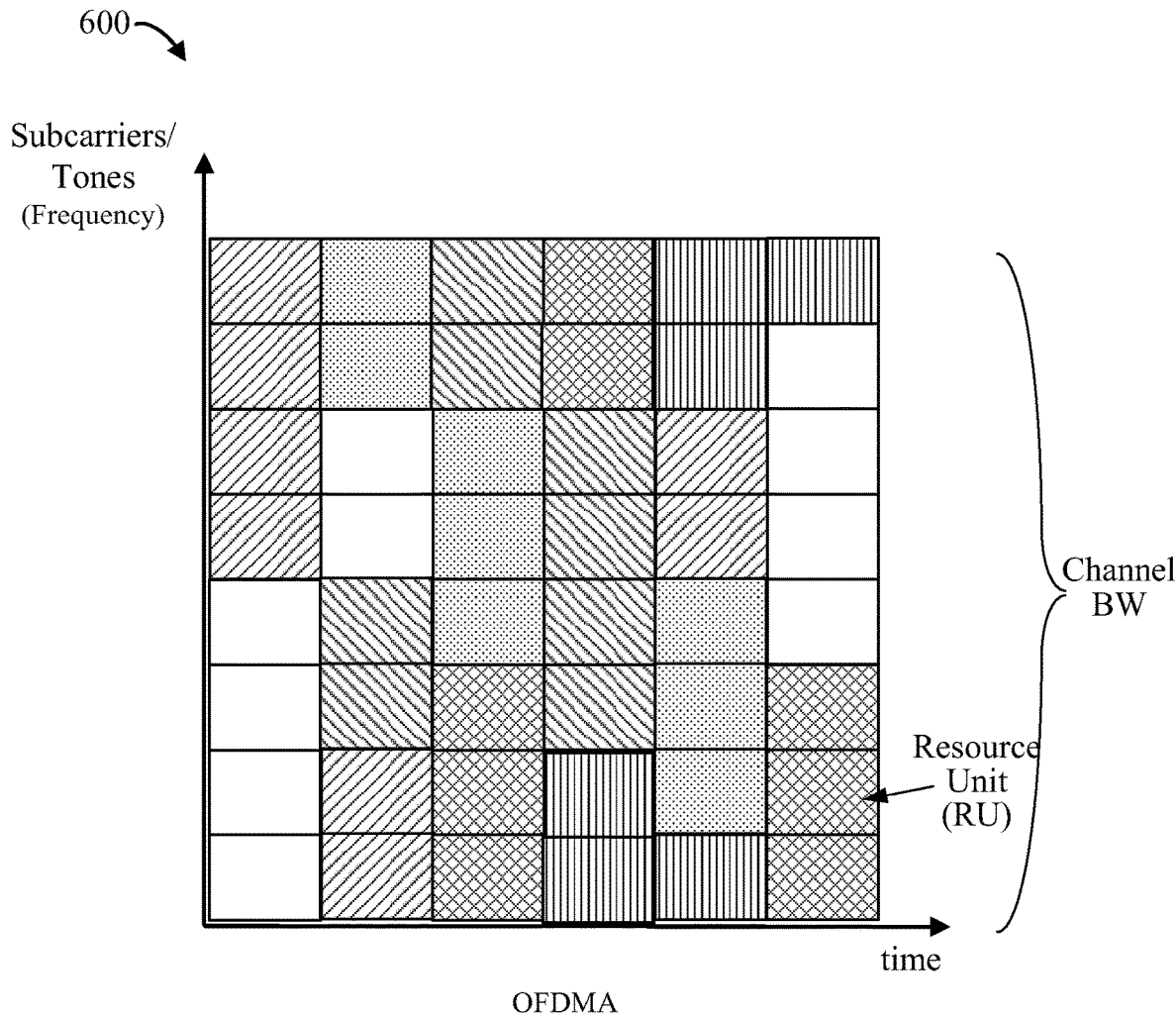
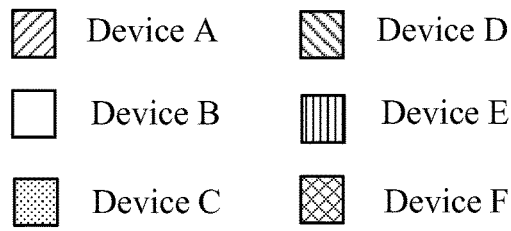
FIG. 6

|  | Sym Dur | Tone Spacing | 80MHz | 160MHz | 320MHz |
|---|---|---|---|---|---|
| Option 1 | 1x | 312.5kHz | 256 | 512 | 1024 |
| Option 2 | 2x | 156.25kHz | 512 | 1024 | 2048 |
| Option 3 | 4x | 78.125kHz | 1024 | 2048 | 4096 |

| FFT Size | 256 | 512 | 1024 | 2048 | 4096 |
|---|---|---|---|---|---|
| Index Range | [-128, 127] | [-256, 255] | [-512, 511] | [-1024, 1023] | [-2048, 2047] |

FIG. 7

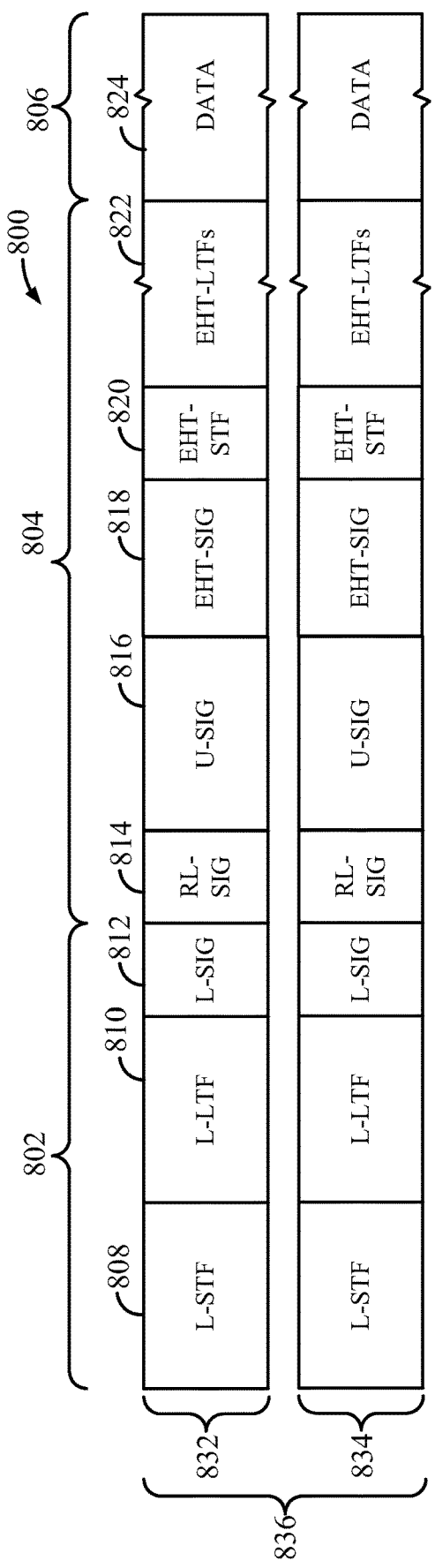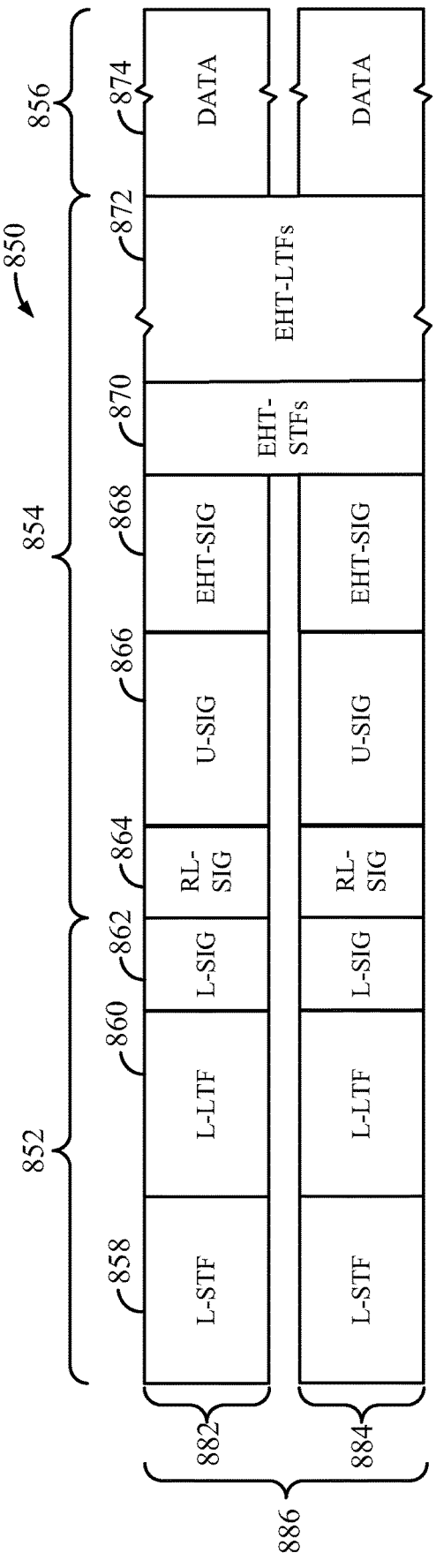

DUPLICATED DATA SEQUENCE TRANSMISSIONS WITH REDUCED PEAK TO AVERAGE POWER RATIO

CROSS-REFERENCE TO RELATED APPLICATIONS

The application claims priority to and the benefit of U.S. provisional patent application No. 63/055,316 filed on Jul. 22, 2020, the entire content of which is incorporated herein by reference as if fully set forth below in its entirety and for all applicable purposes.

TECHNICAL FIELD

The present disclosure relates generally to wireless communication, and more particularly, to duplicated data sequences for communications over wideband channels that may achieve reduced peak-to-average power ratios.

DESCRIPTION OF THE RELATED TECHNOLOGY

As wireless communications have been evolving toward ever increasing data rates, the Institute of Electrical and Electronic Engineers (IEEE) has been evolving its IEEE 802.11 standard to provide increased throughput. Recently, IEEE 802.11be is being developed, which defines Extreme High Throughput (EHT) wireless communications using large bandwidth channels (for example, having a bandwidth of 240 MHz, 320 MHz, or larger). The total channel bandwidth may be comprised of a combination of subchannels (potentially having different sizes) in one or more frequency bands (such as the 5 GHz or 6 GHz frequency bands). The subchannels, which may be contiguous or non-contiguous in the frequency band, may be collectively referred to as a wireless channel.

In an IEEE 802.11be compatible system, wireless communication devices may transmit packets in the form of physical layer convergence protocol (PLCP) protocol data units (PPDUs) using orthogonal frequency-division multiple access (OFDMA), which is a multi-user version of the orthogonal frequency-division multiplexing (OFDM) digital modulation scheme. OFDM employs multi-carrier modulation where a plurality of carriers (such as, parallel sub-carriers), each carrying low bit rate data, are orthogonal to each other. In OFDMA, multiple access is achieved by assigning subsets of subcarriers to individual users or devices.

OFDMA transmissions can have high peak values in the time domain since many subcarrier components are added via an inverse fast Fourier transformation (IFFT) operation. Consequently, OFDMA transmissions may have a high peak-to-average power ratio (PAPR) when compared to single-carrier transmissions. The high PAPR is one of the most detrimental aspects in an OFDMA system as it decreases the signal-to-quantization noise ratio (SQNR) of the analog-digital convertor (ADC) and digital-analog convertor (DAC) while degrading the efficiency of the power amplifier in the transmitter.

A duplicated packet format, referred to as a "DUPed PPDU", has been proposed for use in lower power indoor (LPI) bands to boost power. In a DUPed PPDU, the EHT-modulated portion, including an EHT Short Training Field (STF), an EHT Long Training Field (LTF), and the data, may be duplicated and transmitted simultaneously on two different sub-bands. The duplication is performed in the frequency domain and the signals are transmitted using, for example 80 MHz, 160 MHz, or 320 MHz channels. The duplication in the frequency domain may create periodicity for signals in the time domain, causing increased PAPR to both the data portion and the EHT-STF portion or EHT-LTF portion. The increased PAPR may exceed permissible signal levels thereby causing difficulties for a receiver and nearby wireless devices.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method for wireless communication by a wireless communication device, includes obtaining a physical layer convergence protocol (PLCP) protocol data unit (PPDU) that includes a data field with data content, forming a first sub-PPDU including the data content of the PPDU, forming a second sub-PPDU including the data content of the PPDU, transmitting the first sub-PPDU on a first set of sub-carriers of a wideband channel and the second sub-PPDU on a second set of sub-carriers of the wideband channel, and applying to at least a portion of the second set of sub-carriers before transmitting at least one of: a phase rotation, a phase offset, or a phase ramp.

In another example, the PPDU further comprises a long training field (LTF) sequence, wherein forming a first sub-PPDU comprises forming the first sub-PPDU including the LTF sequence, wherein forming the second sub-PPDU comprises forming the second sub-PPDU including the LTF sequence.

In another example, applying a phase rotation comprises applying a same phase rotation to the data content and LTF sequence. In another example, the LTF comprises an extreme high throughput (EHT) LTF. In another example, the PPDU further comprises a long training field (LTF) sequence, and wherein transmitting further comprises transmitting the LTF sequence of the PPDU on the wideband channel using sub-carriers from among both of the first and the second set of sub-carriers.

In another example, applying the phase rotation comprises applying a phase rotation to each of the second set of subcarriers. In another example, the PPDU further comprises a long training field (LTF) sequence and a short training field (STF) sequence, wherein forming a first sub-PPDU comprises forming the first sub-PPDU including the LTF and STF sequences, wherein forming the second sub-PPDU comprises forming the second sub-PPDU including the LTF and STF sequences, and wherein applying the phase rotation further comprises applying the phase rotation to the LTF and STF sequences.

In another example, applying the phase rotation comprises multiplying the second set of sub-carriers by a constant phase rotation factor of (−1).

In another example, applying the phase offset comprises applying a phase offset to each of the second set of subcarriers. In another example, the second set of subcarriers are ordered with a sequential index and wherein applying the phase ramp comprises applying an additional phase ramp of π to each subcarrier in order of its respective index.

In another example, applying the phase ramp comprises selecting the phase ramp as an equivalent circular delay in a time domain of the second set of sub-carriers and wherein the delay is a fraction of a symbol duration of the data content.

In another example, applying the phase ramp comprises selecting the phase ramp by multiplying an index of a respective subcarrier k by the constant e raised to the power of (j2πkτ)/T, wherein T is a symbol duration of a data symbol of a data sequence, such as the data content, and τ is selected as less than one hundredth of T.

In another example, the first set of sub-carriers are comprised of a first sub-band of the wideband channel, wherein the second set of sub-carriers are comprised of a second sub-band of the wideband channel, and wherein transmitting the second set of sub-carriers comprises transmitting using a higher frequency sub-band of the wideband channel than when transmitting the first set of sub-carriers.

In another example, forming the first sub-PPDU comprises forming the first sub-PPDU with a dual carrier modulation and wherein forming the second sub-PPDU comprises forming the second sub-PPDU with the same dual carrier modulation as for the first sub-PPDU.

In another example, transmitting the first sub-PPDU comprises transmitting with a dual carrier modulation in a single spatial stream and wherein transmitting the second sub-PPDU comprises transmitting with the dual carrier modulation in a second single spatial stream.

In another example, transmitting the first sub-PPDU comprises transmitting on at least one of an uplink sub-band and a downlink sub-band of a low power indoor band.

In another example, transmitting the first sub-PPDU comprises transmitting in an Orthogonal Frequency Division Multiple Access (OFDMA) resource unit (RU) having one of: 484 sub-carriers in a 40 MHz bandwidth duplicated to have 2 RU484s with an 80 MHz bandwidth, 996 sub-carriers in an 80 MHz bandwidth duplicated to have 2 RU996s with a 160 MHz bandwidth, or 2×996 sub-carriers in a 160 MHz bandwidth duplicated to have 2 RU(2×996)s with a 320 MHz bandwidth.

Another example includes, modulating the data content of the first sub-PPDU and the data content of the second sub-PPDU with binary phase shift keying before transmitting and wherein transmitting comprises transmitting the first sub-PPDU and the second sub-PPDU using dual carriers in a single spatial stream.

In another example, the first set of sub-carriers are comprised of a first sub-band of the wideband channel, wherein the second set of sub-carriers are comprised of a second sub-band of the wideband channel, and wherein the first set of sub-carriers are contiguous and do not overlap with the second set of sub-carriers.

Another example includes forming a third sub-PPDU including the data content of the PPDU, and forming a fourth sub-PPDU including the data content of the PPDU, wherein transmitting further comprises transmitting the third sub-PPDU on a third set of sub-carriers of the wideband channel and transmitting the fourth sub-PPDU on a fourth set sub-carriers of the wideband channel, the method further comprising applying to the third set of sub-carriers before transmitting at least one of: a phase rotation, a phase offset, or a phase ramp; and applying to the fourth set of sub-carriers before transmitting at least one of: a phase rotation, a phase offset, or a phase ramp.

In another example, applying the phase rotation comprises multiplying the first, second, third and fourth plurality of sub-carriers by a constant phase rotation factor of (+1, −1, +1, +1), respectively.

In another example, applying a phase ramp comprises applying a phase ramp to a first subset of the second set of sub-carriers and applying a zero phase ramp to a second subset of the second set of sub-carriers, the method further comprising applying a phase ramp to a subset of the first set of sub-carriers.

Another example includes applying different phase rotation factors to long training field sub-sequences of the respective sub-PPDUs.

One example for wireless communication by a wireless communication device, includes obtaining a physical layer convergence protocol (PLCP) protocol data unit (PPDU) that includes a data field with data content, forming a first sub-PPDU including the data content of the PPDU, forming a second sub-PPDU including the data content of the PPDU, wherein the data field of the first and the second sub-PPDU are valid data fields of a PPDU, and carry the same data content, transmitting the first sub-PPDU on a first RU(2× 996) of a wideband channel and the second sub-PPDU on a second RU(2×996) of the wideband channel, wherein the first and second sub-PPDU comprise a DUPed PPDU, and applying to at least one of the RU(2×996) before transmitting at least one of: a phase rotation, a phase offset, or a phase ramp.

These and other aspects of the present disclosure will become more fully understood upon a review of the detailed description, which follows.

BRIEF DESCRIPTION OF THE DRAWINGS

FIG. 3A shows an example physical layer convergence protocol PDU (PPDU) usable for wireless communication between an access point and one or more stations.

FIG. 3B shows another example PPDU usable for wireless communication between an access point and one or more stations.

FIG. 6 illustrates examples of orthogonal frequency-division multiple access (OFDMA) resource unit (RU) allocations.

FIG. 7 illustrates examples of tone spacings and index ranges for various fast Fourier transform (FFT) sizes and symbol durations for 80 MHz, 160 MHz, and 320 MHz transmissions.

FIG. 8A shows an example duplicated PPDU construction in which each sub-PPDU has a different Extreme High Throughput (EHT) short training field (STF) and EHT long training field (LTF) construction.

FIG. 8B shows an example duplicated PPDU construction in which each sub-PPDU has the same EHT-LTF construction.

DETAILED DESCRIPTION

Figure 1:
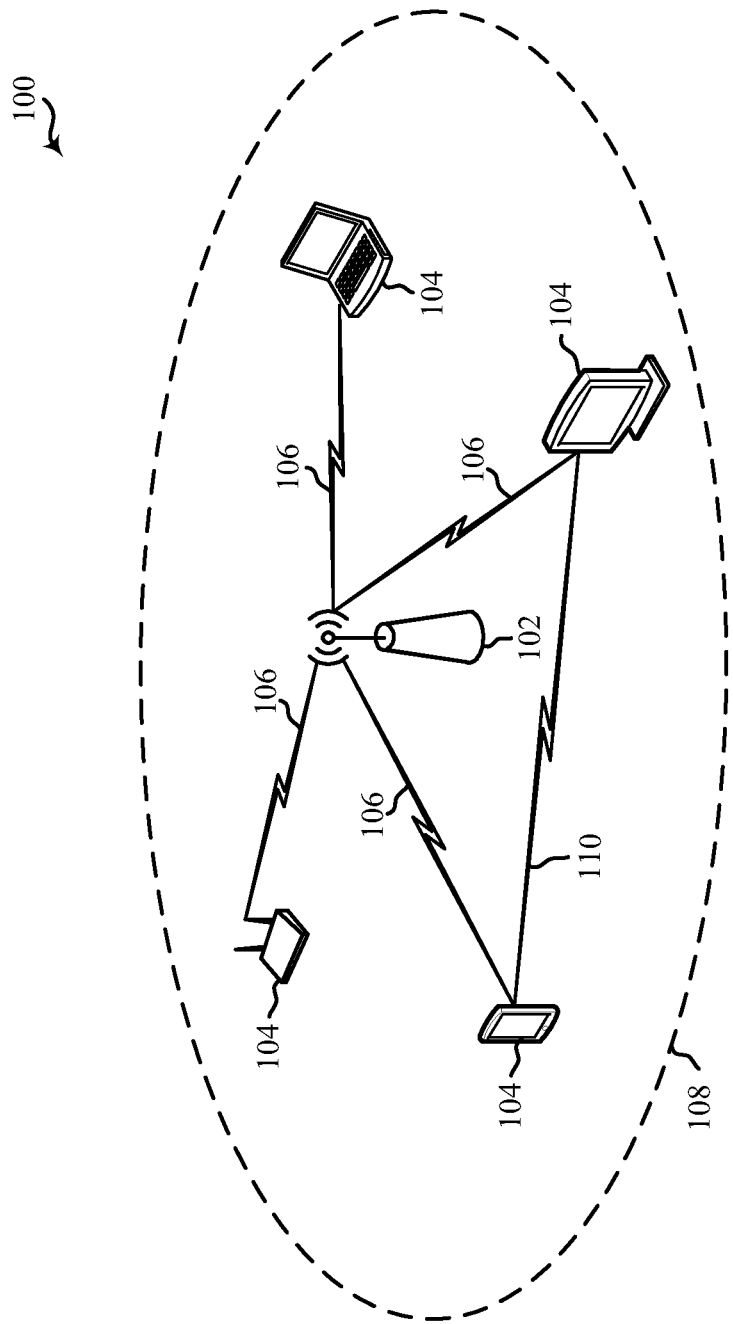
FIG. 1 shows a block diagram of an example wireless communication network.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU)-MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

As the IEEE 802.11 standards evolve to use higher bandwidths (such as 320 MHz in IEEE 802.11be), it has been recognized that OFDMA transmissions can have high peak values in the time domain because many subcarrier components are added via an inverse fast Fourier transformation (IFFT) operation. Consequently, OFDMA transmissions may have a high peak-to-average power ratio (PAPR) when compared to single-carrier transmissions. The high PAPR of OFDMA transmissions decreases the signal-to-quantization noise ratio (SQNR) of the analog-digital convertor (ADC) and digital-analog convertor (DAC) in a radio chain while degrading the efficiency of the power amplifier in a transmitter.

A duplicated packet format, referred to as a "DUPed PPDU", has been proposed for use in lower power indoor (LPI) bands to boost power. In a DUPed PPDU, the EHT-modulated portion, including an EHT Short Training Field (STF), an EHT Long Training Field (LTF), and the data, may be duplicated and transmitted simultaneously on two different sub-bands. The duplication is performed in the frequency domain and the signals are transmitted using, for example 80 MHz, 160 MHz, or 320 MHz channels. The duplication in the frequency domain may create periodicity for signals in the time domain, causing increased PAPR to both the data portion and the EHT-STF portion or EHT-LTF portion. The increased PAPR may exceed permissible signal levels thereby causing difficulties for a receiver and nearby wireless devices.

Various aspects relate generally to mitigating an increase in PAPR typically associated with duplicated PPDU transmissions by modifying the timing or phase of a duplicated PPDU, such as by using a phase rotation, phase offset, phase ramp, or a combination of these modifications. Some aspects more specifically relate to obtaining a DUPed PPDU from a PPDU, and modifying the DUPed PPDU to mitigate PAPR when the PPDU and the DUPed PPDU are transmitted together. The PPDU and DUPed PPDU may be referred to as "sub-PPDUs", these sub-PPDUs having the same data field and data content. For example, a first sub-PPDU is formed including the data content of the PPDU, and a second sub-PPDU is formed including the data content of the PPDU. The first sub-PPDU is transmitted on a first set of sub-carriers of a wideband channel. At least one of a phase rotation, a phase offset, or a phase ramp is applied to at least a portion of a second set of sub-carriers of the wideband channel before transmission. Concurrent or simultaneous with transmission of the first sub-PPDU, the second sub-PPDU is transmitted on the second set of sub-carriers of the wideband channel.

According to another aspect, the PPDU may further comprises a long training field (LTF) sequence. The first sub-PPDU may be formed from the PPDU and includes the LTF sequence. The second sub-PPDU may be formed from the PPDU and also includes the LTF sequence. In one instance, applying a phase rotation to at least a portion of the second set of sub-carriers comprises applying a same phase rotation to the data content and LTF sequence of the second sub-PPDU. The LTF may comprises an Extreme High Throughput (EHT) LTF.

Particular aspects of the subject matter described in this disclosure can be implemented to realize one or more of the following potential advantages. In some examples, the described techniques can be used to transmit DUPed PPDUs without exceeding allowed peak-to-average power ratio levels. Transmission of DUPed PPDUs are particularly beneficial for lower power indoor (LPI) frequency bands to boost signal power without causing interference for other users of the same frequency bands. This duplicated PPDU approach may allow for clear communications without exceeding indoor power limits, that is, without exceeding allowed peak-to-average power ratio levels.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other examples.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11 ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
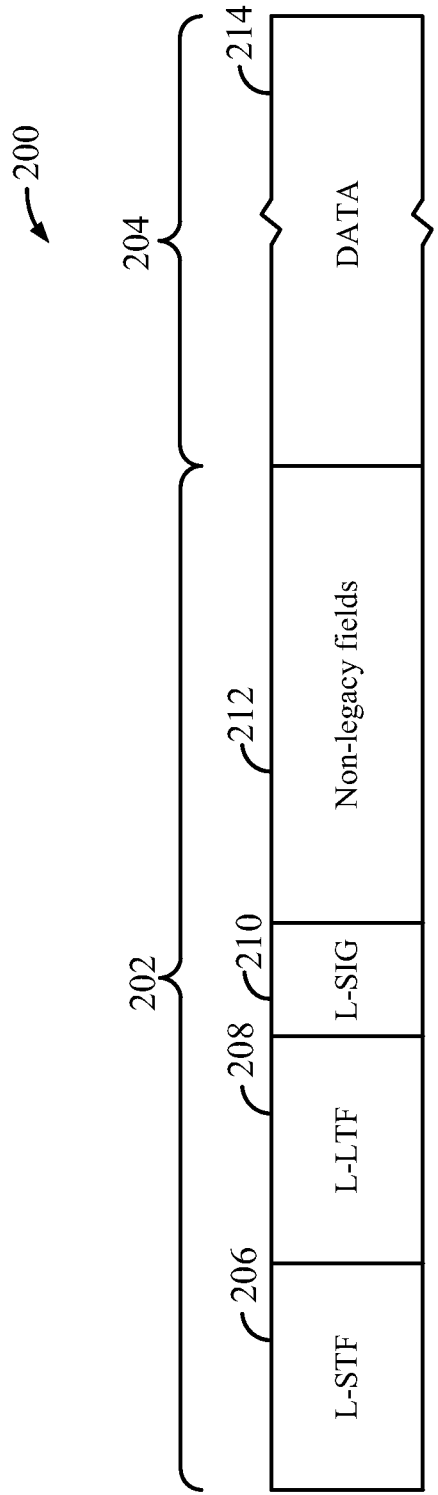
FIG. 2A shows an example protocol data unit (PDU) usable for wireless communication between an access point and one or more stations.

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform coarse timing and frequency tracking and automatic gain control (AGC). The L-LTF 208 generally enables a receiving device to perform fine timing and frequency tracking and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
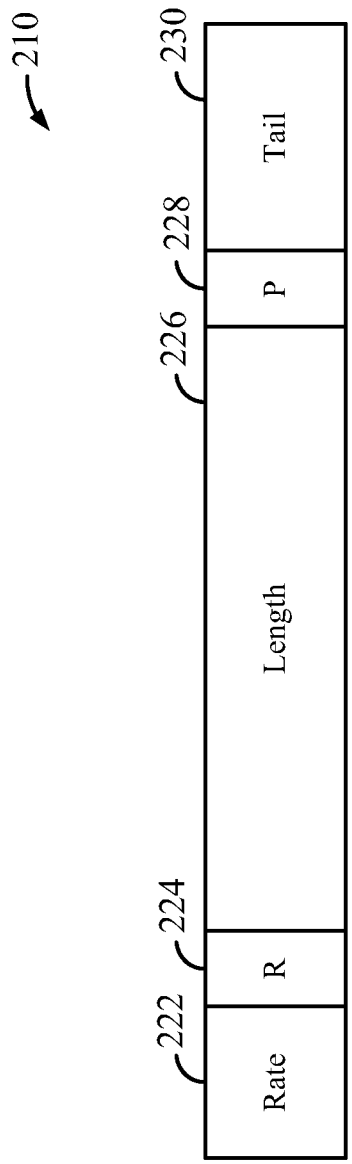
FIG. 2B shows an example legacy signal field (L-SIG) in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 222 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (μs) or other time units.

FIG. 3A shows an example PPDU 300 usable for wireless communication between an AP and one or more STAs. The PPDU 300 may be used for SU, OFDMA or MU-MIMO transmissions. The PPDU 300 may be formatted as a High Efficiency (HE) WLAN PPDU in accordance with the IEEE 802.11ax amendment to the IEEE 802.11 wireless communication protocol standard. The PPDU 300 includes a PHY preamble including a legacy portion 302 and a non-legacy portion 304. The PPDU 300 may further include a PHY payload 306 after the preamble, for example, in the form of a PSDU including a data field 324.

The legacy portion 302 of the preamble includes an L-STF 308, an L-LTF 310, and an L-SIG 312. The non-legacy portion 304 includes a repetition of L-SIG (RL-SIG) 314, a first HE signal field (HE-SIG-A) 316, an HE short training field (HE-STF) 320, and one or more HE long training fields (or symbols) (HE-LTFs) 322. For OFDMA or MU-MIMO communications, the second portion 304 further includes a second HE signal field (HE-SIG-B) 318 encoded separately from HE-SIG-A 316. HE-STF 320 may be used for timing and frequency tracking and AGC, and HE-LTF 322 may be used for more refined channel estimation. Like the L-STF 308, L-LTF 310, and L-SIG 312, the information in RL-SIG 314 and HE-SIG-A 316 may be duplicated and transmitted in each of the component 20 MHz channels in instances involving the use of a bonded channel. In contrast, the content in HE-SIG-B 318 may be unique to each 20 MHz channel and target specific STAs 104.

RL-SIG 314 may indicate to HE-compatible STAs 104 that the PPDU 300 is an HE PPDU. An AP 102 may use HE-SIG-A 316 to identify and inform multiple STAs 104 that the AP has scheduled UL or DL resources for them. For example, HE-SIG-A 316 may include a resource allocation subfield that indicates resource allocations for the identified STAs 104. HE-SIG-A 316 may be decoded by each HE-compatible STA 104 served by the AP 102. For MU transmissions, HE-SIG-A 316 further includes information usable by each identified STA 104 to decode an associated HE-SIG-B 318. For example, HE-SIG-A 316 may indicate the frame format, including locations and lengths of HE-SIG-Bs 318, available channel bandwidths and modulation and coding schemes (MCSs), among other examples. HE-SIG-A 316 also may include HE WLAN signaling information usable by STAs 104 other than the identified STAs 104.

HE-SIG-B 318 may carry STA-specific scheduling information such as, for example, STA-specific (or "user-specific") MCS values and STA-specific RU allocation information. In the context of DL MU-OFDMA, such information enables the respective STAs 104 to identify and decode corresponding resource units (RUs) in the associated data field 324. Each HE-SIG-B 318 includes a common field and at least one STA-specific field. The common field can indicate RU allocations to multiple STAs 104 including RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include two user fields that contain information for two respective STAs to decode their respective RU payloads in data field 324.

FIG. 3B shows another example PPDU 350 usable for wireless communication between an AP and one or more STAs. The PPDU 350 may be used for SU, OFDMA or MU-MIMO transmissions. The PPDU 350 may be formatted as an Extreme High Throughput (EHT) WLAN PPDU in accordance with the IEEE 802.11be amendment to the IEEE 802.11 wireless communication protocol standard, or may be formatted as a PPDU conforming to any later (post-EHT) version of a new wireless communication protocol conforming to a future IEEE 802.11 wireless communication protocol standard or other wireless communication standard. The PPDU 350 includes a PHY preamble including a legacy portion 352 and a non-legacy portion 354. The PPDU 350 may further include a PHY payload 356 after the preamble, for example, in the form of a PSDU including a data field 374.

The legacy portion 352 of the preamble includes an L-STF 358, an L-LTF 360, and an L-SIG 362. The non-legacy portion 354 of the preamble includes an RL-SIG 364 and multiple wireless communication protocol version-dependent signal fields after RL-SIG 364. For example, the non-legacy portion 354 may include a universal signal field 366 (referred to herein as "U-SIG 366") and an EHT signal field 368 (referred to herein as "EHT-SIG 368"). One or both of U-SIG 366 and EHT-SIG 368 may be structured as, and carry version-dependent information for, other wireless communication protocol versions beyond EHT. The non-legacy portion 354 further includes an additional short training field 370 (referred to herein as "EHT-STF 370," although it may be structured as, and carry version-dependent information for, other wireless communication protocol versions beyond EHT) and one or more additional long training fields 372 (referred to herein as "EHT-LTFs 372," although they may be structured as, and carry version-dependent information for, other wireless communication protocol versions beyond EHT). EHT-STF 370 may be used for timing and frequency tracking and AGC, and EHT-LTF 372 may be used for more refined channel estimation. Like L-STF 358, L-LTF 360, and L-SIG 362, the information in U-SIG 366 and EHT-SIG 368 may be duplicated and transmitted in each of the component 20 MHz channels in instances involving the use of a bonded channel. In some implementations, EHT-SIG 368 may additionally or alternatively carry information in one or more non-primary 20 MHz channels that is different than the information carried in the primary 20 MHz channel.

EHT-SIG 368 may include one or more jointly encoded symbols and may be encoded in a different block from the block in which U-SIG 366 is encoded. EHT-SIG 368 may be used by an AP to identify and inform multiple STAs 104 that the AP has scheduled UL or DL resources for them. EHT-SIG 368 may be decoded by each compatible STA 104 served by the AP 102. EHT-SIG 368 may generally be used by a receiving device to interpret bits in the data field 374. For example, EHT-SIG 368 may include RU allocation information, spatial stream configuration information, and per-user signaling information such as MCSs, among other examples. EHT-SIG 368 may further include a cyclic redundancy check (CRC) (for example, four bits) and a tail (for example, 6 bits) that may be used for binary convolutional code (BCC). In some implementations, EHT-SIG 368 may include one or more code blocks that each include a CRC and a tail. In some aspects, each of the code blocks may be encoded separately.

EHT-SIG 368 may carry STA-specific scheduling information such as, for example, user-specific MCS values and user-specific RU allocation information. EHT-SIG 368 may generally be used by a receiving device to interpret bits in the data field 374. In the context of DL MU-OFDMA, such information enables the respective STAs 104 to identify and decode corresponding RUs in the associated data field 374. Each EHT-SIG 368 may include a common field and at least one user-specific field. The common field can indicate RU distributions to multiple STAs 104, indicate the RU assignments in the frequency domain, indicate which RUs are allocated for MU-MIMO transmissions and which RUs correspond to MU-OFDMA transmissions, and the number of users in allocations, among other examples. The common field may be encoded with common bits, CRC bits, and tail bits. The user-specific fields are assigned to particular STAs 104 and may be used to schedule specific RUs and to indicate the scheduling to other WLAN devices. Each user-specific field may include multiple user block fields. Each user block field may include, for example, two user fields that contain information for two respective STAs to decode their respective RU payloads.

The presence of RL-SIG 364 and U-SIG 366 may indicate to EHT- or later version-compliant STAs 104 that the PPDU 350 is an EHT PPDU or a PPDU conforming to any later (post-EHT) version of a new wireless communication protocol conforming to a future IEEE 802.11 wireless communication protocol standard. For example, U-SIG 366 may be used by a receiving device to interpret bits in one or more of EHT-SIG 368 or the data field 374.

As described above, APs 102 and STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In MU-OFDMA schemes, the available frequency spectrum of the wireless channel may be divided into multiple resource units (RUs) each including multiple frequency subcarriers (also referred to as "tones"). Different RUs may be allocated or assigned by an AP 102 to different STAs 104 at particular times. The sizes and distributions of the RUs may be referred to as an RU allocation. In some implementations, RUs may be allocated in 2 MHz intervals, and as such, the smallest RU may include 26 tones consisting of 24 data tones and 2 pilot tones. Consequently, in a 20 MHz channel, up to 9 RUs (such as 2 MHz, 26-tone RUs) may be allocated (because some tones are reserved for other purposes). Similarly, in a 160 MHz channel, up to 72 RUs may be allocated. Larger 52 tone, 106 tone, 242 tone, 484 tone and 996 tone RUs may also be allocated. Adjacent RUs may be separated by a null subcarrier (such as a DC subcarrier), for example, to reduce interference between adjacent RUs, to reduce receiver DC offset, and to avoid transmit center frequency leakage.

For UL MU transmissions, an AP 102 can transmit a trigger frame to initiate and synchronize an UL MU-OFDMA or UL MU-MIMO transmission from multiple STAs 104 to the AP 102. Such trigger frames may thus enable multiple STAs 104 to send UL traffic to the AP 102 concurrently in time. A trigger frame may address one or more STAs 104 through respective association identifiers (AIDs), and may assign each AID (and thus each STA 104) one or more RUs that can be used to send UL traffic to the AP 102. The AP also may designate one or more random access (RA) RUs that unscheduled STAs 104 may contend for.

Certain aspects of the present disclosure may support allowing APs 102 to allocate STAs 104 transmissions in optimized ways to improve efficiency. Both high efficiency wireless (HEW) stations, stations utilizing an 802.11 high efficiency protocol (such as IEEE 802.11ax), and stations using older or legacy 802.11 protocols (such as 802.11b), can compete or coordinate with each other in accessing a wireless medium.

In some implementations, APs 104 can transmit on a wireless medium according to various DL tone plans for HEW STAs. For example, with respect to FIG. 1, the STAs 104 can be HEW STAs. In some implementations, the HEW STAs can communicate using a symbol duration four times that of a legacy STA. Accordingly, each symbol which is transmitted may be four times as long in duration. When using a longer symbol duration, each of the individual tones may use one-quarter as much bandwidth to be transmitted. For example, in various implementations, a 1× symbol duration can be 3.2 µs, a 2× symbol duration can be 6.4 µs, and a 4× symbol duration can be 12.8 µs. The AP 104 can transmit messages to the HEW STAs 104 according to one or more tone plans, based on a communication bandwidth. In some aspects, the AP 102 may be configured to transmit to multiple HEW STAs simultaneously, using OFDMA.

Figure 4:
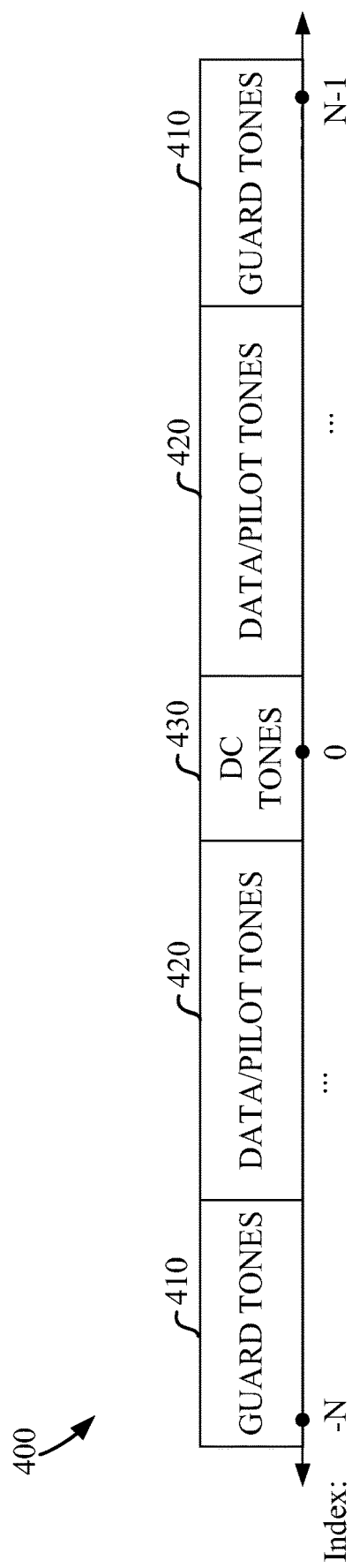
FIG. 4 shows an example 2N-tone plan.

FIG. 4 shows an example 2N-tone plan 400. In some implementations, the tone plan 400 may correspond to OFDM tones, in the frequency domain, generated using a 2N-point fast Fourier transform (FFT). The tone plan 400 includes 2N OFDM tones indexed—N to N-1. The tone plan 400 includes two sets of edge or guard tones 410, two sets of data/pilot tones 420, and a set of direct current (DC) tones 430. In some implementations, the edge or guard tones 410 and DC tones 430 can be null. In some implementations, the tone plan 400 may include another suitable number of pilot tones or may include pilot tones at other suitable tone locations.

In some aspects, OFDMA tone plans may be provided for transmission using a 4× symbol duration, as compared to various IEEE 802.11 protocols. For example, 4× symbol duration may use a number of symbols which can be each 12.8 µs in duration (different from symbols in certain other IEEE 802.11 protocols which may be 3.2 µs in duration).

In some aspects, OFDMA tone plans may be provided for transmission using a 2× symbol duration, as compared to various IEEE 802.11 protocols. For example, the 2× symbol duration may use a number of symbols which can be each 6.4 µs in duration (different from symbols in certain other IEEE 802.11 protocols which may be 3.2 µs or 12.8 µs in duration).

In some aspects, the data/pilot tones 420 of a transmission 400 may be divided among any number of different users. For example, the data/pilot tones 420 may be divided among one and eight users. In order to divide the data/pilot tones 420, an AP 104 or another device may signal to the various devices, indicating which devices may transmit or receive on which tones (of the data/pilot tones 420) in a particular transmission. Accordingly, systems and methods for dividing the data/pilot tones 420 may be desired, and this division may be based upon a tone plan.

A tone plan may be chosen based on a number of different characteristics. For example, it may be beneficial to have a simple tone plan, which can be consistent across most or all bandwidths. For example, an OFDMA transmission may be transmitted over 20, 40, 80, 160, 240, or 320 MHz (or a combination thereof), and it may be desirable to use a tone plan that can be used for any of these bandwidths. Further, a tone plan may be simple in that it uses a smaller number of building block sizes. For example, a tone plan may contain a unit which may be referred to as resource unit (RU). This unit may be used to assign a particular amount of wireless resources (for example, bandwidth or particular tones) to a particular user. For example, one user may be assigned bandwidth as a number of RUs, and the data/pilot tones 420 of a transmission may be broken up into a number of RUs.

A tone plan also may be chosen based on efficiency. For example, transmissions of different bandwidths (for example, 20, 40, 80, 160, 240, or 320 MHz, or a combination thereof) may have different numbers of tones. Reducing the number of leftover tones may be beneficial. Further, it may be beneficial if a tone plan is configured to preserve 20, 40, 80, 160, 240, or 320 MHz boundaries in some implementations. For example, it may be desirable to have a tone plan which allows each 20, 40, 80, 160, 240, or 320 MHz portion to be decoded separately from each other, rather than having allocations which can be on the boundary between two different 20, 40, 80, 160, 240, or 320 MHz portions of the bandwidth. For example, it may be beneficial for interference patterns to be aligned with 20, 40, 80, 160, 240, or 320 MHz channels. Further, it may be beneficial to have channel bonding, which also may be known as preamble puncturing, such that when a 20 MHz transmission and a 40 MHz transmission can be transmitted, to create a 20 MHz "hole" in the transmission when transmitted over 80, 160, 240, or 320 MHz. This may allow, for example, a legacy packet to be transmitted in this unused portion of the bandwidth. This puncturing may apply to any transmission (for example, 20, 40, 80, 160, 240, or 320 MHz transmissions) and may create "holes" of at least 20 MHz in the transmission regardless of the channel or bandwidth being used. Finally, it also may be advantageous to use a tone plan which provides for fixed pilot tone locations in various transmissions, such as in different bandwidths.

As data transmission rate demands increase with additional devices joining networks or additional data being added for transmission over networks, larger channel bandwidths may be introduced, for example for orthogonal frequency-division multiple access (OFDMA) transmissions. In one example, tone plans for a 320 MHz total channel bandwidth may be introduced to assist in increasing peak system transmission data rates and to more efficiently utilize available channels. For example, as new frequencies are available for use (for example, 6 GHz), these new tone plans for the larger total channel bandwidths may more efficiently utilize the newly available channels. Moreover, an increased total bandwidth which may be provided by these new tone plans may allow for better rate vs range tradeoff. In this case, the same or a similar transmission rate may be used to provide larger coverage if a larger total bandwidth is used. Additionally, the larger total channel bandwidths also may increase tone plan efficiency (for example, for a particular BW, how many tones could be used for data transmission) and also may increase a number of guard bands. As with any total channel bandwidth being used, different modes may be available depending on channel availability. For example, current 80 MHz channel bandwidths may be separated into 20 MHz, 40 MHz, or 80 MHz modes.

Figure 5:
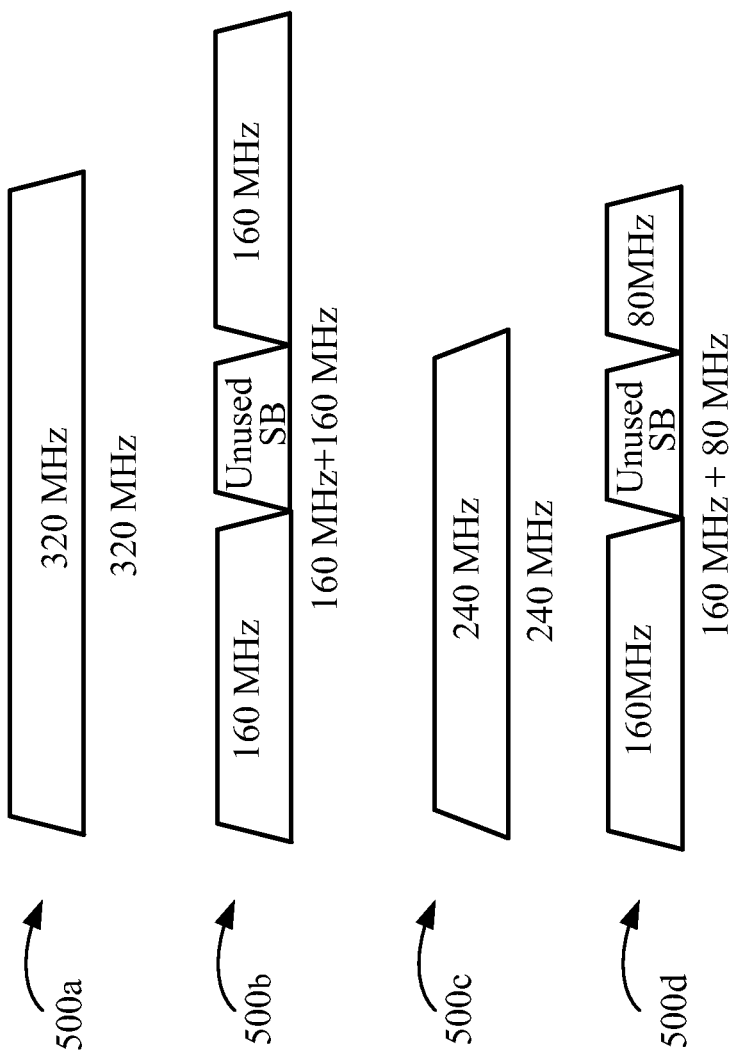
FIG. 5 shows example modes available for 320 MHz bandwidth transmissions and 240 MHz bandwidth transmissions.

FIG. 5 shows example modes 500a-500d available for 320 MHz bandwidth transmissions and 240 MHz bandwidth transmissions. These may be some of the bandwidth modes available in IEEE 802.11be. As shown in FIG. 5, the 320 MHz bandwidth transmissions may be transmitted in at least two different modes as shown in 500a and 500b. Each of the modes 500a and 500b may represent a different combination of channel bandwidth (BW) and frequency bands that may be used, depending on channel availability (for example, in 2.4, 5, or 6 GHz networks). In a first mode 500a, the 320

MHz transmission may be transmitted in a single, contiguous frequency band having 320 MHz bandwidth. In a second mode 500b, the 320 MHz transmission may be transmitted in two non-contiguous, disjoint frequency bands having 160 MHz bandwidth and 80 MHz bandwidth, respectively. As shown, each of the frequency bands is separated by unused sub-bands (SBs). In this context, unused SBs refer to portions of the frequency band that are not part of the wireless channel.

Similarly, the 240 MHz bandwidth transmissions may be transmitted in at least two different modes as shown in 500c and 500d. In a third mode 500c, the 240 MHz transmission may be transmitted in a single, contiguous frequency band having 240 MHz bandwidth. In a fourth mode 500d, the 240 MHz transmission may be transmitted in two non-contiguous, disjoint frequency bands having 160 MHz bandwidth and 80 MHz bandwidth, respectively. As shown, each of the frequency bands is separated by unused sub-bands (SBs). In this context, unused SBs refer to portions of the frequency band that are not part of the wireless channel.

In some implementations, tone plans may be designed and signal generation may be completed for contiguous frequency bands of 80 MHz, 160 MHz, and 320 MHz bandwidth sizes.

Each of the modes 500a-500d may have one or more options for creating the 320 MHz bandwidth transmission or the 240 MHz bandwidth transmission. The first mode 500a may include (1) a first option of having a single 320 MHz tone plan; (2) a second option of duplicating two 160 MHz tone plans, one in each of two PHY 160 MHz subchannels and separated by an unused SB; and (3) a third option of duplicating four 80 MHz tone plans, one in each of four PHY 80 MHz subchannels separated by unused SBs. The second mode 500b may include (1) a first option of using two 160 MHz tone plans, each in one PHY 160 MHz subchannel and (2) a second option of duplicating four 80 MHz tone plans, one in each of four PHY 80 MHz subchannels and separated by unused SBs. The third mode 500c may include (1) a first option of having a single 240 MHz tone plan; (2) a second option of one 160 MHz tone plan in one PHY 160 MHz subchannel and one 80 MHz subchannel in one PHY 80 MHz subchannel and separated by an unused SB; and (3) a third option of duplicating three 80 MHz tone plans, one in each of three PHY 80 MHz subchannels separated by unused SBs.

Based on these modes and options, different tone plans may be designed or generated for the 80, 160, or 320 MHz bandwidths. Tone plan designs for 80 MHz, 160 MHz, and 320 MHz for 3 symbol duration options are the building blocks. In some implementations, the different frequency bands may use different symbol durations. For example, for the third option of the 320 MHz frequency band, the 160 MHz frequency band may use a first symbol duration while the 80 MHz frequency bands may use a second symbol duration different from the first symbol duration. In some implementations, the tone plans for the 320 MHz bandwidth may be generated or designed based on the building blocks (for example, the 80 and 160 MHz transmissions discussed herein).

The different modes described herein for the 320 MHz channel bandwidth and 240 MH channel bandwidth may provide different options of symbol durations and tone spacings, depending on the mode being used.

FIG. 6 illustrates examples of OFDMA resource unit (RU) allocations. In an OFDMA system 600, multiple client devices (stations) may communicate (transmit or receive) with an access point (AP) at the same time by sharing available bandwidth. OFDMA allows sub-carriers (also referred to as "tones") in a channel bandwidth to be grouped into smaller portions called "Resource Units" (RU). Each RU may consists of a group of tones. In various example implementations, an RU may consist of 26 tones, 52 tones, 106 tones, 242 tones, 484 tones, or 996 tones. That is, RUs may have different sizes depending on the number of tones or subcarriers in an RU, such that for example an RU26 contains 26 tones and an RU52 contains 52 tomes, and so on. These individual RU's are assigned to different client devices or stations, which allows the access point to serve them simultaneously during uplink and downlink transmissions. In the OFDMA allocation system 600, individual RUs may be allocated to each device communicating over the wireless network, the RUs need not be contiguous.

Although not illustrated in FIG. 6, some RUs may be scheduled to carry one or more physical channels, including control channels, shared channels, data channels, etc. Other RUs may also carry pilots or reference signals. These pilots or reference signals (for example, including long training fields or LTFs) may provide for a receiving device to perform channel estimation of the corresponding channel, which may enable coherent demodulation/detection of the control or data channels within the RU.

FIG. 7 illustrates examples of tone spacings and index ranges for various fast Fourier transform (FFT) sizes and symbol durations for 80 MHz, 160 MHz, and 320 MHz transmissions. Various 802.11 protocols may use 1× symbol durations. The 1× symbol durations may have a tone spacing of 312.5 kHz. Some 802.11 protocols may also use 4× symbol durations. The 4× symbol durations may have a tone spacing of 78.125 kHz. Next generation 802.11 devices and standards may utilize either the 1× or 4× symbol durations and may also utilize a 2× symbol duration of 6.4 µs having a tone spacing of 156.25 kHz. Specifically, FIG. 7 shows an FFT size for each option (for example, combination of symbol duration and tone spacing). For example, the 80 MHz channel bandwidth (BW) has 256 tones available at 1× symbol duration and 312.5 kHz spacing (option 1), 512 tones available at 2× symbol duration and 156.25 kHz spacing (option 2), and 1024 tones available at 4× symbol duration and 78.125 kHz spacing (option 3). The 160 MHz channel BW has 512 tones available at 1× symbol duration and 312.5 kHz spacing, 1024 tones available at 2× symbol duration and 156.25 kHz spacing, and 2048 tones available at 4× symbol duration and 78.125 kHz spacing. The 320 MHz channel BW has 1024 tones available at 1× symbol duration and 312.5 kHz spacing, 2048 tones available at 2× symbol duration and 156.25 kHz spacing, and 4096 tones available at 4× symbol duration and 78.125 kHz spacing. In some aspects, 1× and 2× symbol durations may have similar benefits as compared to a 4× symbol durations. In some aspects, 1× and 2× symbol durations may have lower complexity, latency, and memory requirements due to corresponding smaller Fast Fourier Transform (FFT) sizes as compared to the 4× symbol duration, which has a higher complexity, latency, and memory requirement due to its larger FFT size. The 1× and 2× symbol durations each have a lower tone plan and acyclic prefix (CP) or guard interval (GI) efficiency than the 4× symbol duration that has a higher tone plan and GI efficiency. Furthermore, the 1× and 2× symbol durations may not have outdoor support while the 4× symbol duration may have outdoor support, although the 320 MHz bandwidth may be generally used indoors. The 1× and 2× symbol durations may need a new design to provide OFDMA support, as they cannot be mixed with high efficiency STAs in DL/UL OFDMA. However, the 4× symbol duration may provide OFDMA support, as it can be mixed with HE STAs in DL/UL OFDMA. When memory size is not being considered, then the 4× symbol duration may be a more natural choice for symbol duration. However, if maintaining memory size is the goal, then the 1× or 2× symbol duration may be considered. For 1× trigger based PPDU, the UL overhead of 50% in view of the 1.6 µs GI is too high, so the 2× symbol duration may be more likely a selection. In some implementations, reduced symbol durations may advantageously result in reduced complexity and reduced memory utilization.

In one example, data symbols may have a 4× symbol duration, which is 12.8 µs+GI (guard interval). By contrast, LTF symbols may have various multiples of a symbol duration. A 1×LTF uses 1× symbol duration, which is 3.2 µs+GI. A 2×LTF uses 2× symbol duration, which is 6.4 µs+GI. A 4×LTF uses 4× symbol duration, which is 12.8 µs+GI, same as data symbols. In 802.11ax, defines three different GI values: 0.8 µs, 1.6 us, and 3.2 µs. Each one of the three values may be selected based on the PPDU format and channel condition. The same GI may be applied to LTF field and data field. For packets using 1×LTF, either 0.8 µs or 1.6 µs GIs can be used depending on the PPDU format. For packets using 2×LTF, either 0.8us or 1.6 µs GIs can be used depending on the PPDU format. For packets using 4×LTF, either 0.8 µs, or 3.2 µs GIs may be used depending on PPDU format or channel condition.

Accordingly, the index ranges of the tones for each of these options is shown in FIG. 7, which shows that 256 tones have a range of [−128, 127], 512 tones have a range of [−256, 255], 1024 tones have a range of [−512, 511], 2048 tones have a range of [−1024, 1023], and 4096 tones have a range from [−2048, 2047].

As the IEEE 802.11 standards evolve to use higher bandwidths (such as, 320 MHz in IEEE 802.11be), it has been recognized that OFDM transmissions can have high peak values in the time domain since many subcarrier components are added via an inverse fast Fourier transformation (IFFT) operation. Consequently, OFDM transmissions may have a high peak-to-average power ratio (PAPR) when compared to single-carrier transmissions. The high PAPR of OFDM and OFDMA transmissions decreases the signal-to-quantization noise ratio (SQNR) of the analog-digital convertor (ADC) and digital-analog convertor (DAC) in a radio chain while degrading the efficiency of the power amplifier in a transmitter.

A DUPed or duplicated PPDU as used herein refers to generating a second frame that duplicated the entire original PPDU or at least the data portion. The two or more PPDUs now referred to as sub-PPDUs are then sent on more than one sub-band at the same time. The duplicated PPDU is particularly useful for lower power indoor (LPI) bands to boost power without causing interference for other users of the same frequency bands. In indoor wireless communications, such as WLAN communications, there may be other nearby users of the same frequency bands and there may be radio obstacles such as walls, wiring, pipes and other fixtures. As a result, data communications may be impeded notwithstanding the short distances between an AP and a STA, or between STAs in Wi-Fi Direct. The duplicated PPDU approach may overcome these difficulties and allow for clear communication without exceeding indoor power limits.

FIG. 8A shows an example of a duplicated PPDU 800 usable for 2X DUPed wireless communication between an AP and one or more STAs or between STAs with Wi-Fi Direct. Such a PPDU is suitable for uplink and downlink transmissions between an AP and a STA. The DUPed PPDU 800 is designed for use with MCS0 (Modulation and Coding Stream 0, defined as Binary Phase Shift Keying (BPSK)) transmission using a single spatial stream (1ss). However, the DUPed PPDU may be applied to many other transmission scenarios in other contexts. The DUPed PPDU 800 may be formatted as an Extreme High Throughput (EHT) WLAN PPDU in accordance with the IEEE 802.11be amendment to the IEEE 802.11 wireless communication protocol standard, or may be formatted as a DUPed PPDU conforming to any later (post-EHT) version of a new wireless communication protocol conforming to a future IEEE 802.11 wireless communication protocol standard or other wireless communication standard. The DUPed PPDU 800 includes two frames 836. The first frame may be referred to a first sub-PPDU 832 and the second frame may be referred to as a second sub-PPDU 834. The two frames are identical and are formed based on an original input PPDU or the second frame may simply be made as a copy of the first frame.

The components or elements of the PPDU 800 are shown as being the same or similar to those of FIG. 3B and may be modified and configured as described with reference to that description. Each sub-PPDU 832, 834 includes a PHY preamble including a legacy portion 802 and a non-legacy portion 804 followed by a PHY payload 806 after the preamble, for example, in the form of a PSDU including a data field 824.

The legacy portion 802 of the preamble includes an L-STF 808, an L-LTF 810, and an L-SIG 802. The non-legacy portion 804 of the preamble includes an RL-SIG 804 followed by a U-SIG 816 and an EHT-SIG 818. The non-legacy portion 804 further includes an additional EHT-STF 820 and EHT-LTF 822. These fields carry the signals and information as described above for these fields. The second sub-PPDU carries the same fields in the same order. In some aspects, the training, signals and data are all duplicated.

In some aspects, the legacy portion 802 is transmitted using a legacy MCS, such as MCS0 and with 1 ss. The non-legacy portion may be transmitted with higher level MCS levels and higher data rate. In some aspects, the DUPed PPDU is transmitted also with MCS0 and 1ss and DCM (Dual Carrier Modulation) so that the entire frame for both sub-PPDUs 832, 834 is modulated and transmitted the same way. Dual carrier modulation may be used to send each sub-PPDU 832, 834 modulated on its own carrier.

FIG. 8B shows an alternative DUPed PPDU 850 in which a portion of the non-legacy training 870, 872 is transmitted over the full wideband channel bandwidth differently from the legacy portion 852 and differently from the data portion 874. The sequences are selected based on the full wideband channel bandwidth. The alternative DUPed PPDU 850 includes two frames 886. The first frame may be referred to a first sub-PPDU 882 and the second frame may be referred to as a second sub-PPDU 884. The two frames are mostly identical and are formed based on an original input PPDU or the second frame may simply be made as a copy of the first frame.

The components or elements of the DUPed PPDU 850 are the same or similar to those of FIG. 8A except for a portion of the non-legacy training 870, 872 and may be modified and configured as described with reference to that description. Each sub-PPDU 882, 884 includes a PHY preamble including a legacy portion 852 and a non-legacy portion 854 followed by a PHY payload 856 after the preamble. The legacy portion 852 of the preamble includes an L-STF 858, an L-LTF 860, and an L-SIG 862. The non-legacy portion 854 of the preamble includes an RL-SIG 864, a U-SIG 866 and an EHT-SIG 868. The second sub-PPDU 884 carries the same fields and the data in the same order. In some aspects, the training, signals and data are all duplicated. The non-legacy portion 854 further includes an EHT-STF 870 and EHT-LTF 872. These fields are not duplicated but are transmitted using the entire bandwidth of the first and the second sub-PPDUs.

In some aspects the symbol sequences for the EHT-STF 820 and EHT-LTF 822 are selected to minimize PAPR. When such sequences are duplicated and sent simultaneously in two different sub-PPDUs 832, 834 as in FIG. 8A, then the duplication may cause an increase in the PAPR. This may be addressed by choosing different symbol sequences or by using a phase rotation, phase offset, and phase ramp as described herein. Alternatively, by transmitting at least some of the training fields of the non-legacy portion 854 using the full wideband channel, the PAPR for the training symbol sequences is not affected. While only the EHT-STF 870 and EHT-LTF 872 are shown as being stretched across both sub-bands and both frames 882, 884, the same modification may be applied to any one or more of the other fields of the non-legacy portion 854 of the DUPed PPDU 850. The sequence in each STF and LTF is based on the bandwidth that is to be used. STF and LTF sequences are defined based on the transmission bandwidth. A sequence designed for the sub-PPDU bandwidth is a different sequence from one that is designed for wideband channel bandwidth.

Three bandwidth concepts are described herein with respect to the use of a DUPed PPDU: sub-PPDU bandwidth, overall bandwidth (sometimes referred to as wideband channel), and sub-band bandwidth. The sub-PPDU bandwidth as used herein is the bandwidth that is directly linked to a particular sub-PPDU. The wideband channel, as used herein, is the overall transmission bandwidth of the DUPed PPDU by all of the sub-PPDUs together. This may be described as the sub-PPDU bandwidth factored by the duplication order. For a duplication order of 2 in which there are 2 sub-PPDUs, the wideband channel is twice the sub-PPDU bandwidth.

Sub-band bandwidth, as used herein, is selected based on the communication system needs for the particular link. It is not necessarily linked to the sub-PPDU bandwidth or to the wideband channel. In some aspects, the wideband channel is divisible by the sub-band bandwidth.

In one transmission example, a DUPed PPDU is selected to have a sub-PPDU size equal to RU(2×996) and a duplication order of two (2). An RU(2×996) occupies a bandwidth of 160 MHz, so the sub-PPDU bandwidth is 160 MHz. Applying the duplication order of 2 gives a wideband channel of 320 MHz to transmit the DUPed PPDU. In some aspects, the sub-band bandwidth is selected as 160 MHz, which equals a single sub-PPDU bandwidth. In this case there are only two sub-bands, and each sub-PPDU will be transmitted over a single sub-band.

In another transmission example, a sub-band bandwidth of 80 MHz is used. In this case there are 4 are used sub-bands, each sub-band having an 80 MHz bandwidth, for a total bandwidth of 320 MHz. Each 160 MHz sub-PPDU is transmitted over two adjacent 80 MHz sub-bands. The sub-bands are grouped as follows: [sub-band 1, sub-band 2] for sub-PPDU1, [sub-band 3, sub-band 4] for sub-PPDU2.

In a third transmission example, a sub-band bandwidth of 40 MHz is used for the same two 160 MHz sub-PPDUs. Eight (8) sub-bands in total are used, each sub-band having a 40 MHz bandwidth, for a total bandwidth of 320 MHz. Sub-bands 1-4 are used for transmission of one sub-PPDU, while sub-band 5-8 are used for transmission of another sub-PPDU.

In a fourth transmission example, a sub-band bandwidth of 64 MHz is used. In this case, there are 5 sub-bands in total, each sub-band having a 64 MHz bandwidth, for a total bandwidth of 320 MHz. Sub-PPDU1 is transmitted over sub-bands 1, 2, and half of sub-band 3; sub-PPDU 2 is transmitted over the other half of sub-band 3, sub-band 4, and sub-band 5. In this case, one sub-band (sub-band 3) crosses over two sub-PPDUs. The allocation of sub-bands may be provided in still other variations.

The sub-PPDU bandwidth and overall bandwidth (wideband channel) may be selected using the available transmission bandwidth and the desired duplication order. The duplication order may be selected based on the quality of the available radio channels. The sub-band bandwidth is selected independently based on various factors such as PAPR values, ease of implementation, continuity requirements, among others.

The sub-PPDUs may be considered as being transmitted on one or more sub-bands. In this view, the first sub-PPDU is transmitted on a first set of N sub-bands of a wideband channel and the second sub-PPDU is transmitted on a second set of N sub-bands of the same wideband channel. The two sets of N or 2N sub-bands are non-overlapping, have equal sub-band bandwidth, and are transmitted together. Stated another way, the wideband channel is divided into 2N sub-bands that are evenly distributed to each of the sub-PPDUs and the PAPR mitigation techniques are applied to the sub-band.

In both options, a phase-modification technique is applied to one or more of the sub-PPDUs by applying the technique to the sub-carriers that carry the particular sub-PPDU. While in some transmissions the same integer number of sub-bands is included for each sub-PPDU, this is not required. In other transmissions, the sub-carriers of a sub-band are split between one or more sub-PPDUs. For example, 2 sub-PPDUs over a wideband channel that is divided into 5 sub-bands may be transmitted by splitting one of the sub-bands between the two sub-PPDUs.

As described above, in some aspects there is a possible separation between a sub-PPDU and a sub-band and between the use of the sub-carriers in a particular sub-band. Different treatments may be applied to different subcarriers even within the same sub-band and for the same sub-PPDU. The present techniques provide for the possibility of applying different treatments to subcarriers within a sub-PPDU. Consider an example in which there are 20 subcarriers in total and in which the first 10 sub-carriers, 1-10, are used to transmit sub-PPDU 1 and the second 10 sub-carriers, 11-20, are used to transmit sub-PPDU 2. In some aspects, some of the first set of sub-carriers, for example sub-carriers 1-5 are unchanged. Others of the first set of sub-carriers, such as sub-carriers 6-10 have a phase ramp of n/3 applied. A phase-ramp value of it is applied to a part of the second set of subcarriers, such as sub-carriers 11-15. The remainder of the second set of sub-carriers has no phase modifications. This is an example of just one such scenario. While the duplicate PPDUs or sub-PPDUs are assigned to a particular set of sub-carriers and may be assigned to contiguous non-overlapping sub-carriers. The phase modification may be distributed to the sub-carriers partially or fully in different combinations to reduce the PAPR.

For the DUPed PPDU, the transmissions may use the conventional sub-band distributions as building blocks for duplication such as 40, 80, and 160 MHz. When duplicated by an order of 2 then these become duplicated bandwidths of 80, 160, and 320 MHz. In other words, 2 copies of a 40 MHz RU(484) requires 80 MHz. Transmitting the first sub-PPDU is in an Orthogonal Frequency Division Multiple Access (OFDMA) resource unit (RU) having one of the standard sub-band provisions. One RU has 484 sub-carriers in a 40 MHz bandwidth duplicated to have 2 RU484s with an 80 MHz bandwidth. RU996 has 996 sub-carriers in an 80 MHz bandwidth and is duplicated to have 2 RU996s with a 160 MHz bandwidth. RU(2×996) in a 160 MHz bandwidth is duplicated to have 2 RU(2×996)s with a 320 MHz bandwidth. This divisions accommodate existing channel allocations but may be modified as appropriate for particular channel conditions. In addition, the particular symbol numbers and bandwidths may be modified to suit other implementations.

Several different phase modification techniques may be applied to the sub-carriers that are carrying a DUPed PPDU. In some aspects a simple phase rotation is applied to the data in a given sub-band. This may be expressed as [a(1)*sub-band1, a(N)* sub-bandN] where there are N sub-bands in total. In a further aspect, the same phase rotation is given to the LTF and to data in given sub-PPDU. In this example the sub-band is indicated by the index of 1 to N for each of N sub-bands. The phase rotation factor a(1) indicates a phase rotation factor which may be selected to reduce PAPR. This phase rotation factor may be selected as either +1 or −1.

In the example of a 2× duplicated PPDU, such as for 2×(RU484) or 2×(RU996), a phase rotation of −1 to the upper sub-band and no rotation to the lower sub-band may be applied. In an example of a 320 MHz DUPed PPDU, which may be expressed as 2×(RU2×996) a (+1/−1) phase rotation may be applied. In some implementation, the wideband channel bandwidth is divided into 4 sub-bands, and an optimal set of coefficients may be given by (+1, −1, +1, +1).

While a DUPed PPDU even with MCSO and a single spatial stream may increase median PAPR of the data field by over 2 dB, with phase modifications this may be reduced to eliminate the increase in PAPR altogether. A simple phase rotation of ±1 is effective for a 320 MHz duplicated wideband channel.

In further aspects, the phase modification is a phase ramp and a phase offset applied to each set of sub-carriers. The set of sub-carriers may be all sub-carries in a sub-band or a subset of those sub-carriers and different modifications may be applied to different subsets. In one aspect, a multiplier of $$e^{j\theta + \frac{j2\pi kt}{T}},$$

is applied to the sub-carriers where T is the symbol duration. The phase ramp $$e^{\frac{j2\pi kt}{T}}$$

and an offset $e^{j\theta}$ may be applied to each element (kth sub-carrier) in a sub-band or any others set of sub-carriers; the phase ramp and offset may be different for different subsequences (sub-bands), that is, $\{(\tau_1, \theta_1), ((\tau_2, \theta_2), \ldots (\tau_N, \theta_N)\}$.

As one example, there is no phase offset, so that, $\theta_i \equiv 0$. In addition, there is no phase ramp-up in the lower half of the PPDU bandwidth, that is, $t_1=0$. A π phase ramp-up, that is, $$t_2 = \frac{T}{2},$$

may be applied in the upper half of PPDU bandwidth, equivalent to multiplying odd-indexed tones by (−1). In another example, instead of a π phase ramp-up, a small phase ramp-up is used in the upper half of the PPDU bandwidth. PAPR may be optimized by choosing a $t_2$ between −30 ns and 30 ns. This small phase ramp-up allows for the phase to be modified with no change to the receiver. A large phase ramp-up may require that the receiver receive a signal indicating the ramp-up size.

An example of a phase ramp-up for different sub-bands is indicated in the following table. In which the values in the table are applied only to the upper half of the PPDU bandwidth.

TABLE

| PPDU BW | Modification | θ | τ | T |
|---|---|---|---|---|
| 80 MHz Dup-PPDU | π-phase ramp-up | 0 | 6.4 μs | 12.8 μs |
|  | Small phase ramp | 0 | 25 ns | 12.8 μs |
| 160 MHz Dup-PPDU | π-phase ramp-up | 0 | 6.4 μs | 12.8 μs |
|  | Small phase ramp | 0 | 25 ns | 12.8 μs |
| 320 MHz Dup-PPDU | π-phase ramp-up | 0 | 6.4 μs | 12.8 μs |
|  | Small phase ramp Option 1 | 0 | 25 ns | 12.8 μs |
|  | Small phase ramp Option 2 | 0 | 30 ns | 12.8 μs |

For the STF and LTF, the same phase modification may be used or in some aspects an additional phase rotation may be used. Alternatively, the STF and LTF may use the whole wideband channel and an additional phase rotation may be applied. In some implementations, a wideband STF and LTF have a lower PAPR than when the STF and LTF are duplicated.

Figure 9:
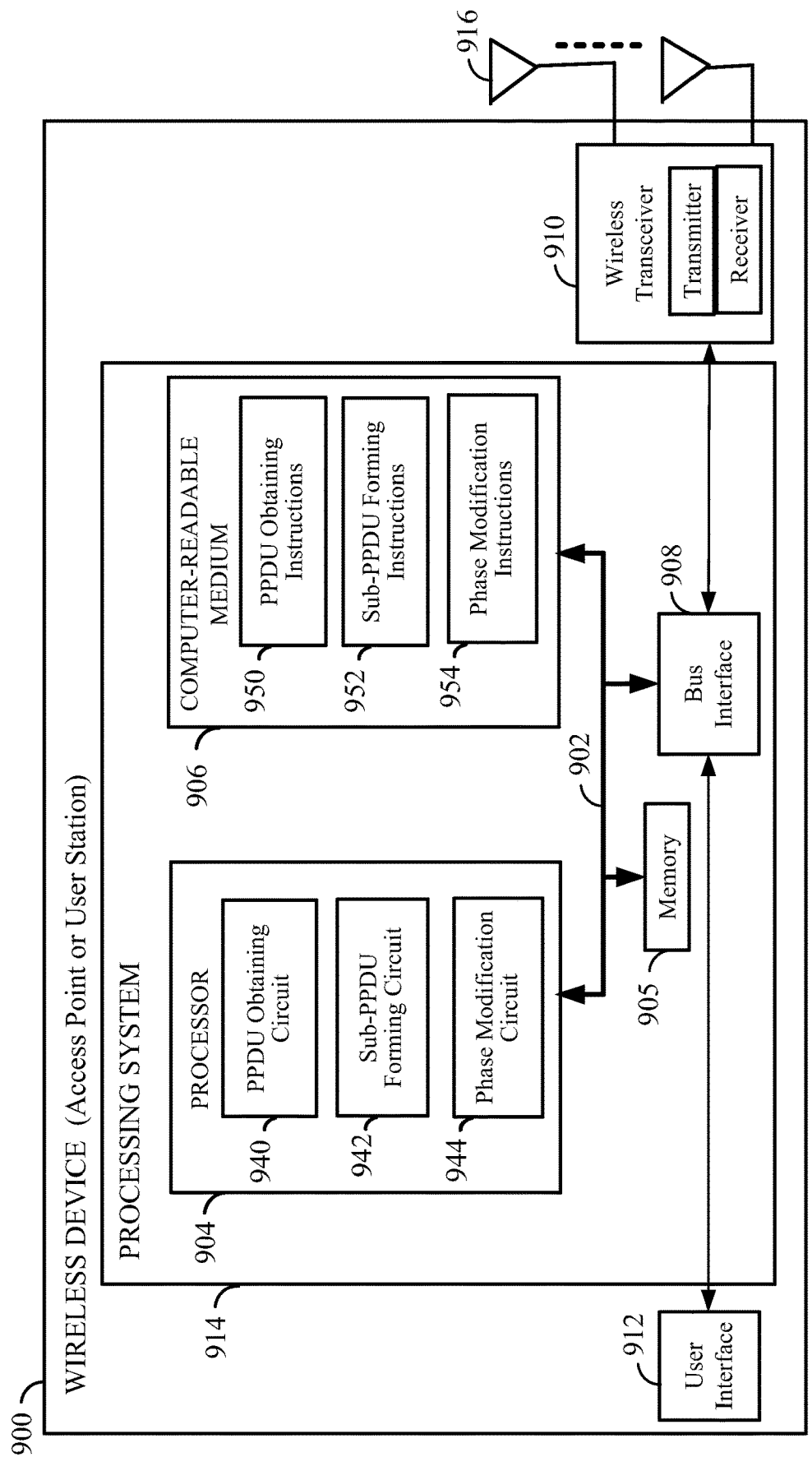
FIG. 9 is a block diagram illustrating an example of a wireless communication device that supports duplicated PPDUs for communications over wide bandwidth channels that may achieve reduced peak-to-average power ratios.

FIG. 9 is a block diagram illustrating an example of a wireless communication device that supports training fields for communications over large bandwidth channels that may achieve reduced peak-to-average power ratios. The wireless communication device 900 may be, for example, an access point or a user station, and may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 900 may be configured to perform any one or more of the functions described herein. That is, the processor 904, as utilized in the wireless communication device 900, may be used to implement any one or more of the processes and procedures further illustrated in the flow diagrams of FIG. 10, to be discussed later.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), a memory 905, and computer-readable media (represented generally by the computer-readable medium 906). The bus 902 may also link various other circuits such as timing sources, peripherals, voltage regulators, and power management circuits, which are well known in the art, and therefore, will not be described any further. A bus interface 908 provides an interface between the bus 902 and a wireless transceiver 910 (comprising a transmitter and a receiver). The wireless transceiver 910 provides a communication interface or means for communicating with various other apparatus over a transmission medium. For instance, the wireless transceiver 910 may transmit and receive to and from one or more wireless communication device using one or more antennas 916 and in accordance with an IEEE 802.11 protocol, such as IEEE 802.11be. In one implantation, the wireless transceiver 914 may have multiple MCS modes, such as BPSK and higher level QAM modes, and multiple spatial stream modes, such as single spatial stream and multiple input multiple output (MIMO) modes.

The processor 904 is responsible for managing the bus 902 and general processing, including the execution of software stored on the computer-readable medium 906. The software, when executed by the processor 904, causes the processing system 914 to perform the various functions described below for any particular apparatus. The computer-readable medium 906 and the memory 905 may also be used for storing data that is manipulated by the processor 904 when executing software.

In one or more examples, the processor 904 may include a PPDU obtaining circuit 940, and a sub-PPDU forming circuit 942, and a phase modification circuit 944. In one example, the PPDU obtaining circuit 940 may serve to obtain a PPDU from a coupled device, buffer, or memory to transmit to another STA or AP. The sub-PPDU generating circuit 942 may serve to duplicate the PPDU or portions of the PPDU such as the payload to form two or more sub-PPDUs. The phase modification circuit 944 may serve to modify the phase of sub-carriers for one or more of the sub-PPDUs using for example, phase rotation, phase offset or a phase ramp.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 906. The computer-readable medium 906 may be a non-transitory computer-readable medium. A non-transitory computer-readable medium includes, by way of example, a magnetic storage device (for example, hard disk, floppy disk, magnetic strip), an optical disk (for example, a compact disc (CD) or a digital versatile disc (DVD)), a smart card, a flash memory device (for example, a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 906 may reside in the processing system 914, external to the processing system 914, or distributed across multiple entities including the processing system 914. The computer-readable medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 906 may include PPDU obtaining instructions 950, sub-PPDU forming instructions 952, and phase modification instructions 954. Of course, in the above examples, the circuitry included in the processor 904 is merely provided as an example, and other means for carrying out the described functions may be included within various aspects of the present disclosure, including but not limited to the instructions stored in the computer-readable storage medium 906, or any other suitable apparatus or means described in any one of the processes or algorithms described herein.

Figure 10:
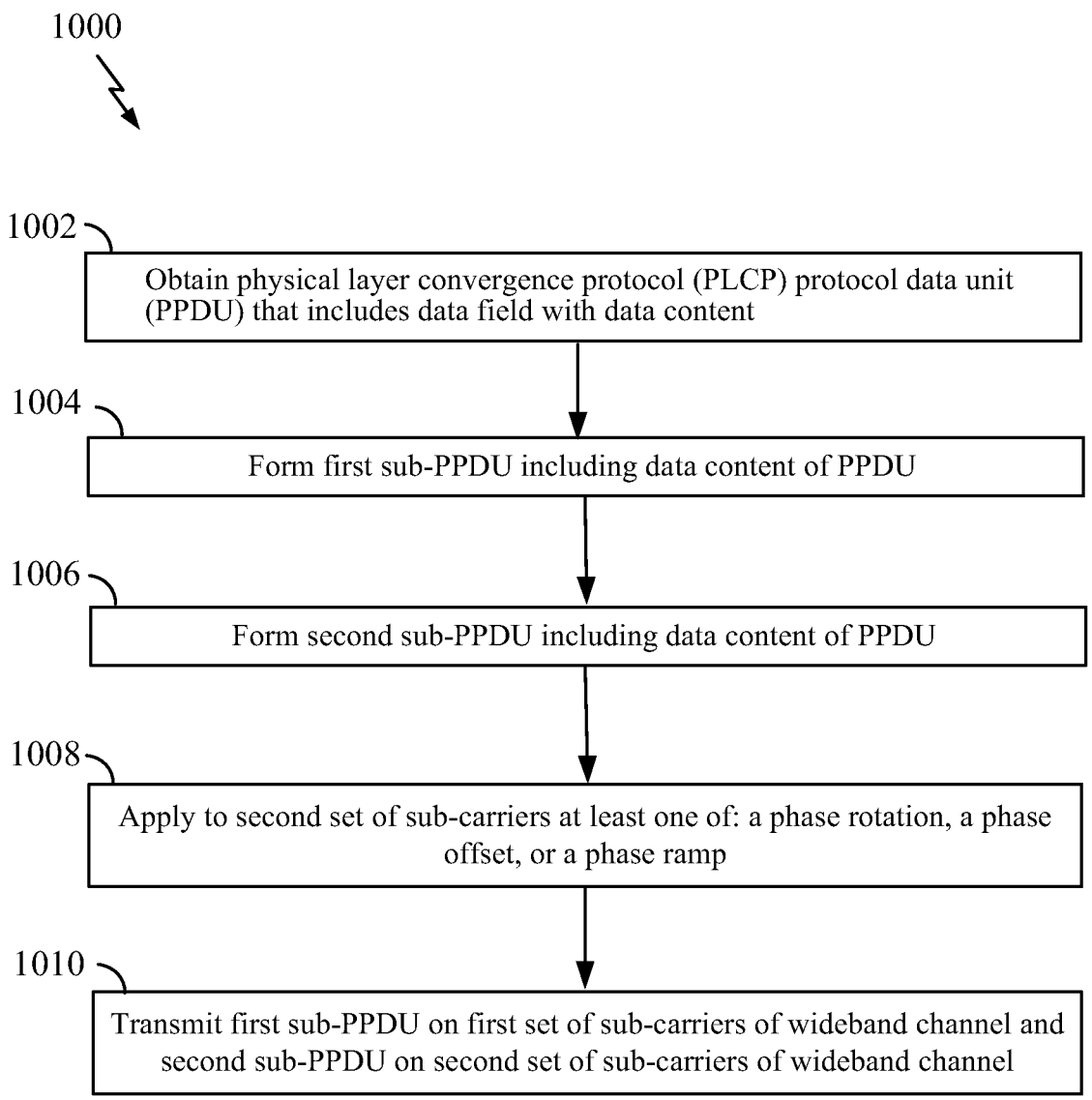
FIG. 10 is a flow chart illustrating an example method operational at a wireless communication device that supports duplicated PPDUs for communications over wide bandwidth channels that may achieve reduced peak-to-average power ratios.

FIG. 10 is a flow chart illustrating an example method 1000 operational at a wireless communication device that supports duplicated PPDUs for communications over wideband channels that may achieve reduced peak-to-average power ratios. At block 1002, a physical layer convergence protocol (PLCP) protocol data unit (PPDU) is obtained that includes a data field with data content. The PPDU may include legacy and non-legacy fields. As used herein, the terms "obtained" and "obtaining" may refer to generating, rendering, forming, constructing, retrieving, or receiving. At block 1004, a first sub-PPDU is formed that includes the data content of the obtained PPDU. At block 1006, a second PPDU is formed that also includes the data content of the obtained PPDU. The sub-PPDUs are the duplicated PPDUs and while they contain the data content, there may be differences in the training and signal portions of the sub-PPDUs.

In some aspects, a sub-PPDU's data field may be defined with specific characteristics. First, for example, it is a valid PPDU data field in and of itself. Second, it may be of what together forms a DUPed PPDU. Third, all of the sub-PPDUs of the DUPed PPDU carry the same information in the data payload. While in this example there are only two sub-PPDUs, there may be four, eight, or any other suitable number of sub-PPDUs to constitute the DUPed PPDU.

At block 1008, a phase modification is applied to the second set of sub-carriers. The phase modifications include one or more of a phase rotation, a phase offset or a phase ramp as described above. While the second set is named here, the phase modifications may alternatively be applied to the first set and the phase modifications are not necessarily applied to every sub-carrier of the respective set. At block 1010, the first sub-PPDU is transmitted on a first set of sub-carriers or tones of a wideband channel and the second sub-PPDU is transmitted on a second set of sub-carriers or tones of the wideband channel.

According to one aspect, the PPDU has a long training field (LTF) sequence, and forming a first sub-PPDU comprises forming the first sub-PPDU including the LTF sequence. Forming the second sub-PPDU also comprises forming the second sub-PPDU including the LTF sequence. Both sub-PPDUs have the same LTF sequence and are transmitted with the sequence. The LTF sequence may be an EHT-LTF sequence or future type of training as discussed above. The phase modification, such as the phase rotation may be applied also to the LTF sequence or only to the data content.

According to another aspect, the PPDU has an LTF sequence, and transmitting further comprises transmitting the LTF sequence of the PPDU on the wideband channel using sub-carriers from among both of the first and the second set of sub-carriers.

Figure 11:
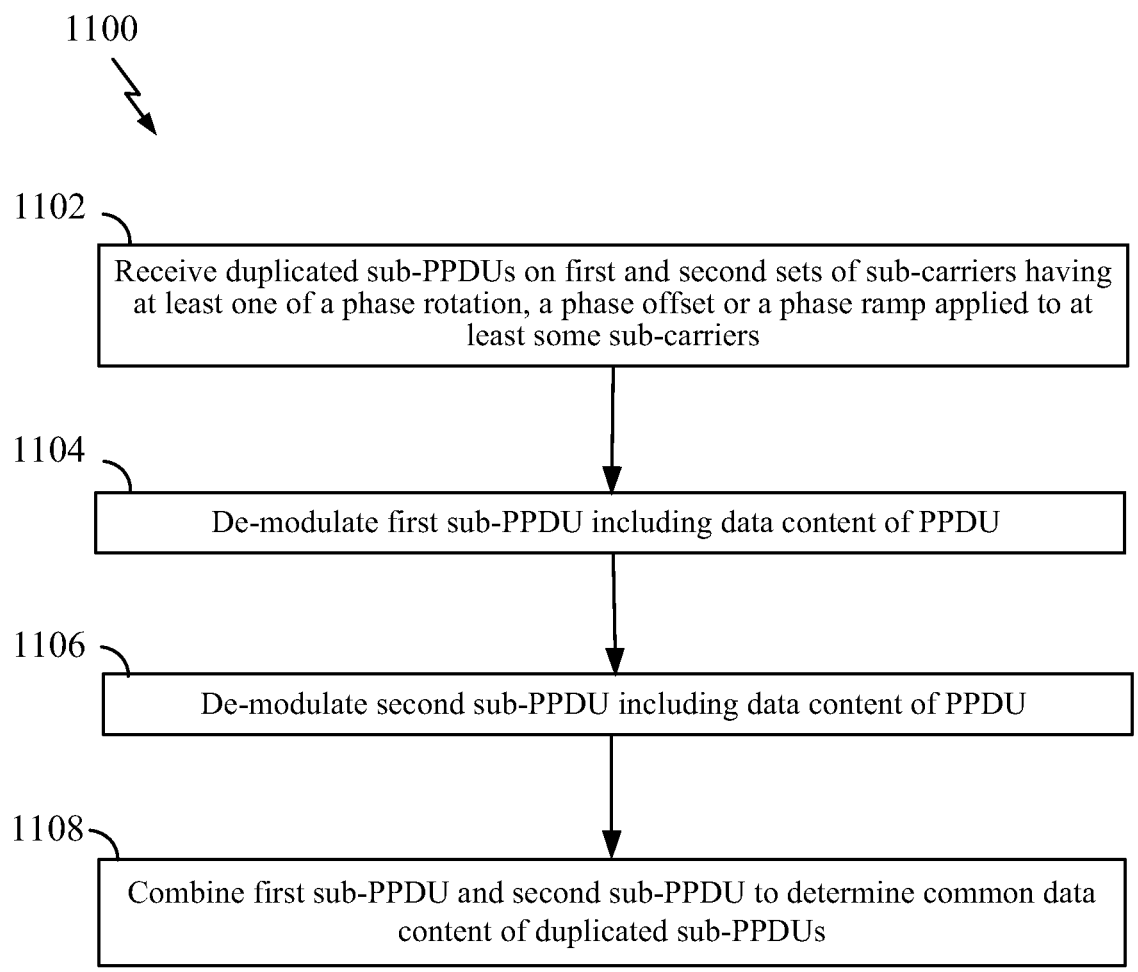
FIG. 11 is a flow chart illustrating an example method operational at a wireless communication device that supports receiving duplicated PPDUs for communications over wide bandwidth channels.

FIG. 11 is a flow chart illustrating an example method 1100 operational at a wireless communication device that supports duplicated PPDUs to receive the transmissions of FIG. 10. The wireless communication device of FIGS. 10 and 11 may be an AP or STA. At block 1102, the duplicated sub-PPDUs are received on first and second sets of sub-carriers having at least one of a phase rotation, a phase offset or a phase ramp applied to at least some sub-carriers. There may be more than two sub-PPDUs depending on the implementation such as 4 or 8 or any other suitable number. The sub-PPDUs all carry the same data content.

At block 1104, the data content of the first sub-PPDU is demodulated and at block 1106, the data content of the second sub-PPDU is demodulated. Any additional sub-PPDUs may also be demodulated. In the described examples the sub-PPDUs are demodulated from BPSK and received in a single spatial stream, but other modulation schemes may be used instead.

At block 1108, the sub-PPDUs are combined to determine the data content that is carried in both or all of the sub-PPDUs. With the payload received, the payload is forwarded to the data consumer to which the payload is addressed.

Aspect 1: A method for wireless communication by a wireless communication device, comprising: obtaining a first sub-physical layer convergence protocol (PLCP) protocol data unit (PPDU) from a PPDU that includes a data field with data content; obtaining a second sub-PPDU by duplicating the PPDU including the data content of the PPDU; applying at least one of a phase rotation, a phase offset, or a phase ramp to at least a portion of a second set of sub-carriers; and transmitting, simultaneously, the first sub-PPDU on a first set of sub-carriers of a wideband channel and the second sub-PPDU on the second set of sub-carriers of the wideband channel.

Aspect 2: The method of aspect 1, wherein the PPDU further comprises a long training field (LTF) sequence, wherein obtaining a first sub-PPDU comprises obtaining the first sub-PPDU including the LTF sequence, obtaining the second sub-PPDU comprises obtaining the second sub-PPDU including the LTF sequence.

Aspect 3: The method of any of aspects 1 or 2, wherein applying a phase rotation comprises applying a same phase rotation to the data content and LTF sequence.

Aspect 4: The method of any of aspects 2 or 3, wherein the LTF comprises an extreme high throughput (EHT) LTF.

Aspect 5: The method of aspect 1, wherein the PPDU further comprises a long training field (LTF) sequence, and wherein transmitting further comprises transmitting the LTF sequence of the PPDU on the wideband channel using sub-carriers from among both of the first and the second set of sub-carriers.

Aspect 6: The method of any of aspects 1, 2, 3, 4, or 5, wherein applying the phase rotation comprises applying a phase rotation to each of the second set of subcarriers.

Aspect 7: The method of any of aspects 1 or 6, wherein the PPDU further comprises a long training field (LTF) sequence and a short training field (STF) sequence, wherein obtaining a first sub-PPDU comprises obtaining the first sub-PPDU including the LTF and STF sequences, obtaining the second sub-PPDU comprises obtaining the second sub-PPDU including the LTF and STF sequences, and applying the phase rotation further comprises applying the phase rotation to the LTF and STF sequences.

Aspect 8: The method of any of aspects 1, 6, or 7, wherein applying the phase rotation comprises multiplying the second set of sub-carriers by a constant phase rotation factor of (−1).

Aspect 9: The method of any of aspects 1, 2, 3, 4, 5, 6, 7, or 8, wherein applying the phase offset comprises applying a phase offset to each of the second set of subcarriers.

Aspect 10: The method of any one of aspects 1 through 9, wherein the second set of subcarriers are ordered with a sequential index and wherein applying the phase ramp comprises applying an additional phase ramp of $\pi$ to each subcarrier in order of its respective index.

Aspect 11: The method of any one of aspects 1 through 10, wherein applying the phase ramp comprises selecting the phase ramp as an equivalent circular delay in a time domain of the second set of sub-carriers and wherein the delay is a fraction of a symbol duration of the data content.

Aspect 12: The method of any one of aspects 1 through 10, wherein applying the phase ramp comprises selecting the phase ramp by multiplying an index of a respective subcarrier k by a constant e raised to a power of $(j2\pi k\tau)/T$, wherein T is a symbol duration of a data symbol of a data sequence and T is selected as less than one hundredth of T.

Aspect 13: The method of aspect 12, further comprising applying a phase offset.

Aspect 14: The method of any one of aspects 1 through 13, wherein the first set of sub-carriers are comprised of a first sub-band of the wideband channel, wherein the second set of sub-carriers are comprised of a second sub-band of the wideband channel, and wherein transmitting the second set of sub-carriers comprises transmitting using a higher frequency sub-band of the wideband channel than when transmitting the first set of sub-carriers.

Aspect 15: The method of any one of aspects 1 through 14, wherein obtaining the first sub-PPDU comprises obtaining the first sub-PPDU with a dual carrier modulation and wherein obtaining the second sub-PPDU comprises obtaining the second sub-PPDU with the same dual carrier modulation as for the first sub-PPDU.

Aspect 16: The method of any one of aspects 1 through 14, wherein transmitting the first sub-PPDU comprises transmitting with a dual carrier modulation in a first single spatial stream and transmitting the second sub-PPDU comprises transmitting with the dual carrier modulation in a second single spatial stream.

Aspect 17: The method of any one of aspects 1 through 16, wherein transmitting the first sub-PPDU comprises transmitting on at least one of an uplink sub-band and a downlink sub-band of a low power indoor band.

Aspect 18: The method of any one of aspects 1 through 17, wherein transmitting the first sub-PPDU comprises transmitting in an Orthogonal Frequency Division Multiple Access (OFDMA) resource unit (RU) having one of: 484 sub-carriers in a 40 MHz bandwidth duplicated to have two (2) RU484s with an 80 MHz bandwidth, 996 sub-carriers in an 80 MHz bandwidth duplicated to have two (2) RU996s with a 160 MHz bandwidth, or 2×996 sub-carriers in a 160 MHz bandwidth duplicated to have two (2) RU(2×996)s with a 320 MHz bandwidth.

Aspect 19: The method of any one of aspects 1 through 18, further comprising modulating the data content of the first sub-PPDU and the data content of the second sub-PPDU with binary phase shift keying before transmission, and wherein transmitting comprises transmitting the first sub-PPDU and the second sub-PPDU using dual carriers in a single spatial stream.

Aspect 20: The method of any one of aspects 1 through 19, wherein the first set of sub-carriers are comprised of a first sub-band of the wideband channel, wherein the second set of sub-carriers are comprised of a second sub-band of the wideband channel, and wherein the first set of sub-carriers are contiguous and do not overlap with the second set of sub-carriers.

Aspect 21: The method of any one of aspects 1 through 20, further comprising: obtaining a third sub-PPDU including the data content of the PPDU; applying, at least one of, a phase rotation, a phase offset, or a phase ramp to a third set of sub-carriers before transmission; obtaining a fourth sub-PPDU including the data content of the PPDU; applying, at least one of, a phase rotation, a phase offset, or a phase ramp to a fourth set of sub-carriers before transmission; and transmitting the third sub-PPDU on the third set of sub-carriers of the wideband channel and transmitting the fourth sub-PPDU on the fourth sub-carriers of the wideband channel.

Aspect 22: The method of any one of aspects 1 through 21, wherein the wideband channel is divided into four (4) sub-bands and wherein applying the phase rotation comprises multiplying the first, second, third and fourth sub-bands by a constant phase rotation factor of (+1, −1, +1, +1), respectively.

Aspect 23: The method of any of aspects 1 through 22, wherein applying a phase ramp comprises applying a phase ramp to a first subset of the second set of sub-carriers and applying a zero phase ramp to a second subset of the second set of sub-carriers, the method further comprising applying a phase ramp to a subset of the first set of sub-carriers.

Aspect 24: The method of any of aspects 1 through 23, further comprising applying different phase rotation factors to long training field sub-sequences of the respective sub-PPDUs.

Aspect 25: A method for wireless communication by a wireless communication device, comprising: obtaining a first sub-physical layer convergence protocol (PLCP) protocol data unit (PPDU) from a PPDU that includes a data field with data content; obtaining a second sub-PPDU by duplicating the PPDU including the data content of the PPDU, wherein the data field of the first and the second sub-PPDUs are valid data fields of a PPDU, and carry the same data as the PPDU; applying at least one of a phase rotation, a phase offset, or a phase ramp to at least one of a first RU(2×996) or a second RU(2×996); and transmitting, simultaneously, the first sub-PPDU on the first RU(2×996) of a wideband channel and the second sub-PPDU on the second RU(2×996) of the wideband channel, wherein the first and second sub-PPDU comprise a duplicated packet format (DUPed) PPDU.

Aspect 26: A wireless communication device, comprising at least one processor and at least one memory communicatively coupled with the at least one processor and storing processor-readable code that, when executed by the at least one processor, is configured to: obtain a first sub-physical layer convergence protocol (PLCP) protocol data unit (PPDU) from a PPDU that includes a data field with data content; obtain a second sub-PPDU by duplicating the PPDU including the data content of the PPDU; apply at least one of a phase rotation, a phase offset, or a phase ramp to at least a portion of a second set of sub-carriers; and transmit, simultaneously, the first sub-PPDU on a first set of sub-carriers of a wideband channel and the second sub-PPDU on the second set of sub-carriers of the wideband channel.

Aspect 27: The device of aspect 26, wherein the PPDU further comprises a long training field (LTF) sequence, wherein obtaining a first sub-PPDU comprises obtaining the first sub-PPDU including the LTF sequence, and obtaining the second sub-PPDU comprises obtaining the second sub-PPDU including the LTF sequence.

Aspect 28: The device of any one of aspects 26 or 27, wherein applying a phase rotation comprises applying a same phase rotation to the data content and LTF sequence.

Aspect 29: The device of any one of aspects 26, 27, or 28, wherein the LTF comprises an extreme high throughput (EHT) LTF.

Aspect 30: The device of any one of aspects 26, 27, 28, or 29, wherein the PPDU further comprises a long training field (LTF) sequence, and wherein transmitting further comprises transmitting the LTF sequence of the PPDU on the wideband channel using sub-carriers from among both of the first and the second set of sub-carriers.

Aspect 31. The device of any one of aspects 26, 27, 28, 29, or 30, wherein applying the phase rotation comprises applying a phase rotation to each of the second set of subcarriers.

Aspect 32: The device of any one of aspects 26 through 31, wherein the PPDU further comprises a long training field (LTF) sequence and a short training field (STF) sequence, wherein obtaining a first sub-PPDU comprises obtaining the first sub-PPDU including the LTF and STF sequences, wherein obtaining the second sub-PPDU comprises obtaining the second sub-PPDU including the LTF and STF sequences, and wherein applying the phase rotation further comprises applying the phase rotation to the LTF and STF sequences.

Aspect 33: The device of any one of aspects 26 through 32, wherein applying the phase rotation comprises multiplying the second set of sub-carriers by a constant phase rotation factor of (−1).

Aspect 34: The device of any one of aspects 26 through 33, wherein applying the phase offset comprises applying a phase offset to each of the second set of subcarriers.

Aspect 35: The device of any one of aspects 26 through 34, wherein the second set of subcarriers are ordered with a sequential index and wherein applying the phase ramp comprises applying an additional phase ramp of $\pi$ to each subcarrier in order of its respective index.

Aspect 36: The device of any one of aspects 26 through 35, wherein applying the phase ramp comprises selecting the phase ramp as an equivalent circular delay in a time domain of the second set of sub-carriers and wherein the delay is a fraction of a symbol duration of the data content.

Aspect 37: The device of any one of aspects 26 through 35, wherein applying the phase ramp comprises selecting the phase ramp by multiplying an index of a respective subcarrier k by the constant e raised to the power of $(j2\pi k\tau)/T$, wherein T is a symbol duration of a data symbol of a data sequence and $\tau$ is selected as less than one hundredth of T.

Aspect 38: The device of any one of aspects 26 through 37, further configured to apply a phase offset.

Aspect 39: The device of any one of aspects 26 through 38, wherein the first set of sub-carriers are comprised of a first sub-band of the wideband channel, wherein the second set of sub-carriers are comprised of a second sub-band of the wideband channel, and wherein transmitting the second set of sub-carriers comprises transmitting using a higher frequency sub-band of the wideband channel than when transmitting the first set of sub-carriers.

Aspect 40: The device of any one of aspects 26 through 38, wherein obtaining the first sub-PPDU comprises obtaining the first sub-PPDU with a dual carrier modulation and wherein obtaining the second sub-PPDU comprises obtaining the second sub-PPDU with the same dual carrier modulation as for the first sub-PPDU.

Aspect 41: The device of any one of aspects 26 through 40, wherein transmitting the first sub-PPDU comprises transmitting with a dual carrier modulation in a single spatial stream and wherein transmitting the second sub-PPDU comprises transmitting with the dual carrier modulation in a second single spatial stream.

Aspect 42: The device of any one of aspects 26 through 40, wherein transmitting the first sub-PPDU comprises transmitting on at least one of an uplink sub-band and a downlink sub-band of a low power indoor band.

Aspect 43: The device of any one of aspects 26 through 42, wherein transmitting the first sub-PPDU comprises transmitting in an Orthogonal Frequency Division Multiple Access (OFDMA) resource unit (RU) having one of: 484 sub-carriers in a 40 MHz bandwidth duplicated to have two (2) RU484s with an 80 MHz bandwidth, 996 sub-carriers in an 80 MHz bandwidth duplicated to have two (2) RU996s with a 160 MHz bandwidth, or 2×996 sub-carriers in a 160 MHz bandwidth duplicated to have two (2) RU(2×996)s with a 320 MHz bandwidth.

Aspect 44: The device of any one of aspects 26 through 43, further configured to modulate the data content of the first sub-PPDU and the data content of the second sub-PPDU with binary phase shift keying before transmission and wherein transmitting comprises transmitting the first sub-PPDU and the second sub-PPDU using dual carriers in a single spatial stream.

Aspect 45: The device of any one of aspects 26 through 44, wherein the first set of sub-carriers are comprised of a first sub-band of the wideband channel, wherein the second set of sub-carriers are comprised of a second sub-band of the wideband channel, and wherein the first set of sub-carriers are contiguous and do not overlap with the second set of sub-carriers.

Aspect 46: The device of any one of aspects 26 through 45, wherein applying a phase ramp comprises applying a phase ramp to a first subset of the second set of sub-carriers and applying a zero phase ramp to a second subset of the second set of sub-carriers, the device further configured to apply a phase ramp to a subset of the first set of sub-carriers.

Aspect 47: The device of any one of aspects 26 through 46, further configured to apply different phase rotation factors to long training field sub-sequences of the respective sub-PPDUs.

Aspect 48: A non-transitory processor-readable medium storing executable instructions, which when executed by one or more processors, causes one or more processors to: obtain a first sub-physical layer convergence protocol (PLCP) protocol data unit (PPDU) from a PPDU that includes a data field with data content; obtain a second sub-PPDU by duplicating the PPDU including the data content of the PPDU; apply at least one of a phase rotation, a phase offset, or a phase ramp to at least a portion of a second set of sub-carriers; and transmit, simultaneously, the first sub-PPDU on a first set of sub-carriers of a wideband channel and the second sub-PPDU on the second set of sub-carriers of the wideband channel.

Aspect 49: A non-transitory processor-readable medium storing executable instructions, which when executed by one or more processors, causes one or more processors to: obtain a first sub-physical layer convergence protocol (PLCP) protocol data unit (PPDU) from a PPDU that includes a data field with data content; obtain a second sub-PPDU by duplicating the PPDU including the data content of the PPDU, wherein the data field of the first and the second sub-PPDU are valid data fields of a PPDU, and carry the same data as the PPDU; apply, at least one of, a phase rotation, a phase offset, or a phase ramp to at least one of a first RU(2×996) or a second RU(2×996); and transmit, simultaneously, the first sub-PPDU on the first RU(2×996) of a wideband channel and the second sub-PPDU on the second RU(2×996) of the wideband channel, wherein the first and second sub-PPDU comprise a duplicated packet format (DUPed) PPDU.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous.

Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
   transmitting a physical layer protocol data unit (PPDU) via a wireless channel, the transmission of the PPDU comprising:
   transmitting a data field via a first set of subcarriers of the wireless channel;
   transmitting, simultaneously with the transmission of the data field, a duplicate of the data field via a second set of subcarriers of the wireless channel, the duplicate of the data field being transmitted with a phase rotation applied to at least one subcarrier of the second set of subcarriers; and
   transmitting a long training field (LTF) via a third set of subcarriers of the wireless channel, the third set of subcarriers including the first set of subcarriers and the second set of subcarriers, the LTF carrying an LTF sequence associated with demodulating the data field and the duplicate data field.

2. The method of claim 1, wherein transmitting the data field comprises modulating a first set of data bits onto the first set of subcarriers, and wherein transmitting the duplicate of the data field comprises duplicating the modulated first set of data bits onto the second set of subcarriers.

3. The method of claim 2, wherein at least a subset of the second set of subcarriers are phase rotated relative to a respective subset of the first set of subcarriers by a factor of +1 or −1.

4. The method of claim 1, wherein the wireless channel is an 80 MHz channel, the first set of subcarriers corresponds to a first 484-tone resource unit (RU), and the second set of subcarriers corresponds to a second 484-tone RU.

5. The method of claim 1, wherein the wireless channel is a 160 MHz channel, the first set of subcarriers corresponds to a first 996-tone resource unit (RU), and the second set of subcarriers corresponds to a second 996-tone RU.

6. The method of claim 1, wherein the wireless channel is a 320 MHz channel, the first set of subcarriers corresponds to a first two 996-tone resource units (RUs), and the second set of subcarriers corresponds to a second two 996-tone RUs.

7. The method of claim 1, wherein the wireless channel is divided into a first, a second, a third and a fourth sub-band, and wherein the phase rotation is applied as part of multiplying the first, second, third and fourth sub-bands by a constant phase rotation factor of +1, −1, +1, and +1, respectively.

8. The method of claim 7, wherein at least one of the first, second, third, or fourth sub-bands includes the first set of subcarriers, and at least another one of the first, second, third, or fourth sub-bands includes the second set of subcarriers.

9. The method of claim 1, wherein the phase rotation is applied as part of applying at least one of a phase offset or a phase ramp to at least a first subset of the second set of subcarriers that includes the at least one subcarrier.

10. The method of claim 9, wherein the phase rotation is applied as part of applying the phase ramp to the first subset of the second set of sub-carriers and applying a zero phase ramp to a second subset of the second set of sub-carriers.

11. The method of claim 9, wherein the second set of subcarriers are ordered with a sequential index and wherein applying the phase ramp comprises applying an additional phase ramp of $\pi$ to a second subset of subcarriers of the second set of subcarriers.

12. The method of claim 9, wherein the phase ramp is associated with an equivalent circular delay in a time domain and wherein the delay is a fraction of a symbol duration of the data field.

13. The method of claim 9, wherein applying the phase ramp comprises multiplying each subcarrier of the second set of subcarriers by $e^{j2\pi k\tau/T}$, wherein k is the index of the respective subcarrier, T is a symbol duration, and $\tau 0$ is less than T.

14. The method of claim 1, further comprising:
   transmitting, simultaneously with the transmission of the data field, a second duplicate of the data field via a fourth set of subcarriers of the wireless channel, the second duplicate of the data field being transmitted with a second phase rotation applied to at least one subcarrier of the fourth set of subcarriers; and
   transmitting, simultaneously with the transmission of the data field, a third duplicate of the data field via a fifth set of subcarriers of the wireless channel, the third duplicate of the data field being transmitted with a third phase rotation applied to at least one subcarrier of the fifth set of subcarriers.

15. A wireless communication device, comprising:
   at least one memory; and
   at least one processor communicatively coupled with the at least one memory and operable to:
   transmit a physical layer protocol data unit (PPDU) via a wireless channel, the transmission of the PPDU comprising:
   transmit a data field via a first set of subcarriers of the wireless channel;
   transmit, simultaneously with the transmission of the data field, a duplicate of the data field via a second set of subcarriers of the wireless channel, the duplicate of the data field being transmitted with a phase rotation applied to at least one subcarrier of the second set of subcarriers; and
   transmit a long training field (LTF) via a third set of subcarriers of the wireless channel, the third set of subcarriers including the first set of subcarriers and the second set of subcarriers, the LTF carrying an LTF sequence associated with demodulating the data field and the duplicate data field.

16. The device of claim 15, wherein transmitting the data field comprises modulating a first set of data bits onto the first set of subcarriers, and wherein transmitting the duplicate of the data field comprises duplicating the modulated first set of data bits onto the second set of subcarriers.

17. The device of claim 16, wherein at least a subset of the second set of subcarriers are phase rotated relative to a respective subset of the first set of subcarriers by a factor of +1 or −1.

18. The device of claim 15, wherein the wireless channel is an 80 MHz channel, the first set of subcarriers corresponds to a first 484-tone resource unit (RU), and the second set of subcarriers corresponds to a second 484-tone RU.

19. The device of claim 15, wherein the wireless channel is a 160 MHz channel, the first set of subcarriers corresponds to a first 996-tone resource unit (RU), and the second set of subcarriers corresponds to a second 996-tone RU.

20. The device of claim 15, wherein the wireless channel is a 320 MHz channel, the first set of subcarriers corresponds to a first two 996-tone resource units (RUs), and the second set of subcarriers corresponds to a second two 996-tone RUs.

21. The device of claim 15, wherein the wireless channel is divided into a first, a second, a third and a fourth sub-band, and wherein the phase rotation is applied as part of multiplying the first, second, third and fourth sub-bands by a constant phase rotation factor of +1, −1, +1, and +1, respectively.

22. The device of claim 21, wherein at least one of the first, second, third, or fourth sub-bands includes the first set of subcarriers, and at least another one of the first, second, third, or fourth sub-bands includes the second set of sub-carriers.

23. The device of claim 15, wherein the phase rotation is applied as part of applying at least one of a phase offset or a phase ramp to at least a first subset of the second set of subcarriers that includes the at least one subcarrier.

24. The device of claim 23, wherein the phase rotation is applied by applying a phase ramp to a first subset of the second set of sub-carriers and applying a zero phase ramp to a second subset of the second set of sub-carriers.

25. The device of claim 23, wherein the second set of subcarriers are ordered with a sequential index and wherein applying the phase ramp comprises applying an additional phase ramp of τ to a second subset of subcarriers of the second set of subcarriers.

26. The device of claim 23, wherein the phase ramp is associated with an equivalent circular delay in a time domain and wherein the delay is a fraction of a symbol duration of the data field.

27. The device of claim 23, wherein applying the phase ramp comprises multiplying each subcarrier of the second set of subcarriers by $e^{j2\pi k\tau/T}$, wherein k is the index of the respective subcarrier, T is a symbol duration, and τ is less than T.

28. The device of claim 15, wherein the at least one memory further storing processor-readable code that, when executed by the at least one processor, is configured to:
transmit, simultaneously with the transmission of the data field, a second duplicate of the data field via a fourth set of subcarriers of the wireless channel, the second duplicate of the data field being transmitted with a second phase rotation applied to at least one subcarrier of the fourth set of subcarriers; and
transmit, simultaneously with the transmission of the data field, a third duplicate of the data field via a fifth set of subcarriers of the wireless channel, the third duplicate of the data field being transmitted with a third phase rotation applied to at least one subcarrier of the fifth set of subcarriers.

* * * * *